United States Patent
Reifler et al.

(10) Patent No.: US 7,417,584 B1
(45) Date of Patent: Aug. 26, 2008

(54) MONOPULSE RADAR ESTIMATION OF TARGET ALTITUDE AT LOW ANGLES OF ELEVATION

(75) Inventors: Frank Joshua Raphael Reifler, Cinnaminson, NJ (US); Randall Deen Morris, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 07/440,394

(22) Filed: Nov. 8, 1989

(51) Int. Cl.
*G01S 13/44* (2006.01)
(52) U.S. Cl. .................... 342/148; 342/149; 342/152; 342/154; 342/194
(58) Field of Classification Search ................ 342/148, 342/149, 152, 154, 195, 194
See application file for complete search history.

(56) References Cited

U.S. PATENT DOCUMENTS

| | | | | |
|---|---|---|---|---|
| 4,163,975 A | * | 8/1979 | Guilhem et al. ............... 342/94 |
| 4,449,127 A | * | 5/1984 | Sanchez ...................... 342/80 |
| 4,589,610 A | * | 5/1986 | Schmidt ..................... 244/3.19 |
| 4,883,244 A | * | 11/1989 | Challoner et al. ........... 244/171 |
| 5,014,064 A | * | 5/1991 | Spencer et al. .............. 342/152 |
| 5,576,711 A | * | 11/1996 | Morris et al. ................ 342/152 |
| 7,053,815 B1 | * | 5/2006 | Joynson et al. ................ 342/62 |
| 7,268,724 B1 | * | 9/2007 | Sherman ..................... 342/149 |

* cited by examiner

*Primary Examiner*—John B Sotomayor
(74) *Attorney, Agent, or Firm*—Duane Morris LLP

(57) ABSTRACT

A monopulse radar operating at low angles of elevation (LOE) receives returns from a target by a direct path and by a path including a reflection from that portion of the Earth's surface lying between the radar and the target. The surface-reflected signal tends to cause errors in the estimate of the elevation of the target. A radar system directs at least upper and lower overlapping beams at LOE toward the target for receiving returns. The upper and lower beams may be sequential or simultaneous. Real and imaginary portions of the sum ($\Sigma$) and difference ($\Delta$) signals are generated for each beam. The monopulse estimates of elevation ê derived from the real portion of the $\Sigma$ and $\Delta$ signals are processed to produce correction signals for upper and lower beams. Each correction signal is weighted and summed to correct the estimate of elevation.

9 Claims, 20 Drawing Sheets

MONOPULSE RADAR ESTIMATION OF TARGET ALTITUDE AT LOW ANGLES OF ELEVATION

This invention relates to method and apparatus for improved estimates of the altitude of a target using conventional or phase monopulse radars when the target is at a low angle of elevation or near the horizon.

Monopulse radar systems achieve relatively high accuracy in determining the position of a target, even though the antenna pattern may be relatively broad, by processing sum ($\Sigma$) and difference ($\Delta$) signals. For example, the 3 dB beamwidth of a radar antenna main lobe may be on the order of 2°. A conventional radar system which depends exclusively upon a narrow beam to determine direction might, with such a beamwidth, be able to estimate the direction of the target within ±1°. By the use of monopulse signal processing techniques, accuracy improvements are possible.

FIG. 1 illustrates in simplified form a prior art conventional monopulse radar system in which an antenna illustrated as 10 directs a beam, illustrated by a contour 12, which is centered along an axis 14 inclined at an exemplary elevation angle of 0.9° relative to the horizontal. As illustrated, contour 12 defines an antenna beam having a 3 dB beamwidth of about 2° in elevation. FIG. 1 is described further below.

Those skilled in the art know that antennas are reciprocal or passive devices, in which the beamwidth and gain are identical in both the transmitting and receiving modes of operation. Either transmission or reception terms are commonly used, with the reciprocal function being understood.

FIG. 2 represents geometric considerations having importance in the estimation of elevation angle by monopulse methods. In FIG. 2, the earth's surface is represented by circle 210 and the Earth's radius by a. In FIG. 1 the Earth is assumed flat but in FIG. 2 the curvature is illustrated. A monopulse radar antenna is located at a point 212 located at a distance H above the Earth's surface, as by mounting on a mast. A target illustrated as a point 214 is located at an altitude Z above the Earth's surface. Once the target 214 has been illuminated by a pulse transmitted from antenna 212, the return signal can travel back to the radar antenna along a direct path 216 and by a further path represented by dotted lines 218a and 218b which reflects from the Earth's surface at a specular point 220. The magnitude of the reflected signal which arrives at radar antenna 212 depends in part upon the reflectivity of the Earth's surface at point 220. At low elevation angles, the length of path 216 and the total length of paths 218a and 218b will be nearly the same. Small differences in path length will result in relative phase shifts between the two paths which may result in constructive or destructive interference of the received signal. For low angles of elevation, both direct return path 216 and two-part return path 218b will lie somewhere near the peak of the beam of the main lobe of the antenna (see FIG. 1). Consequently, the antenna beamwidth cannot be relied upon to separate the direct and reflected signals. As a result, both the direct and reflected signals contribute to the generation of the $\Sigma$ and $\Delta$ signals and to the remainder of the signal processing.

FIGS. 3 and 4 represent the estimated elevation angle versus the true elevation angle for targets at 2- and 30-mile ranges, respectively, using conventional monopulse estimation procedures. These plots are computer-generated, and are based upon the assumption of a perfectly reflecting flat surface at specular point 220 of FIG. 2. As illustrated, plot 312 of FIG. 3 appears to be a roughly periodic function of the true elevation angle. Ideally, the estimated elevation along the ordinate in FIG. 3 would correspond to the true elevation angle of the target along the abscissa, and so plot 312 should ideally lie along a straight line 314, which represents zero error. Lines 316 and 318 above and below line 314, respectively, represent a range of errors of ±¼° relative to the ideal represented by line 314. Plot 312 of FIG. 3 makes excursions substantially above line 316, especially at lower elevation angles. The greatest excursions occur at about ±0.1° true elevation, with errors on the order of 1°. Such large errors at short range might be very important to a vehicle attempting to direct countermeasures toward an approaching threat. Such a threat might be, for example, a cruise missile approaching a ship. Such a cruise missile might be at a small but positive elevation angle when at a distance and might be at a negative elevation angle (a depression angle) when near the ship. Also in FIG. 3, it can be seen that the deviation of the estimated elevation angle away from the true elevation angle becomes less than ±¼° at true elevation angles greater than about 1°, as indicated by the fact that plot 312 lies between lines 316 and 318.

FIG. 4 illustrates generally similar deviations of the estimated elevation angle versus true elevation angle when the target is at a range of 30 miles. In FIG. 4, plot 412 representing the estimate lies between the lines 416 and 418 representing ±¼° error for most true elevation angles greater than about 1.3°, and the errors appear to be decreasing asymptotically with increasing actual elevation angle. At a 30 mile range, errors of ¼° correspond to about 800 feet in altitude. Errors of magnitude greater than ¼° at 30 mile range may be of significance for air traffic control purposes, and such errors occur for true elevation angles of less than about 1.3°.

It is desirable to minimize errors in estimating elevation angles at low angles of elevation.

SUMMARY OF THE INVENTION

A method for determining the elevation of a target includes the steps of transmitting electromagnetic energy towards the target. First and second antenna beams are directed towards the target for reception of reflections of the transmitted electromagnetic energy. The first and second beams are angularly spaced in the vertical plane to produce an upper beam and a lower beam. The angular spacing of the upper and lower beams in the vertical plane is about one third of the 3 dB beamwidth of one of the upper and lower antenna beams. The method combines the sum and difference signals from the upper beam with the sum and difference signals from the lower beam to form an estimate of the true elevation of the target. In one embodiment of the invention, the first and second antenna beams are directed toward the target concurrently, and the steps of forming the upper and lower monopulse estimates are performed concurrently. In another embodiment of the invention, the first (upper or lower) beam is directed toward the target for receiving returns therefrom before the second (lower or upper) beam is formed. The upper monopulse estimate is then generated from the upper return signal and the lower monopulse estimate is formed from the lower return signal.

DESCRIPTION OF THE INVENTION

Figure 1:
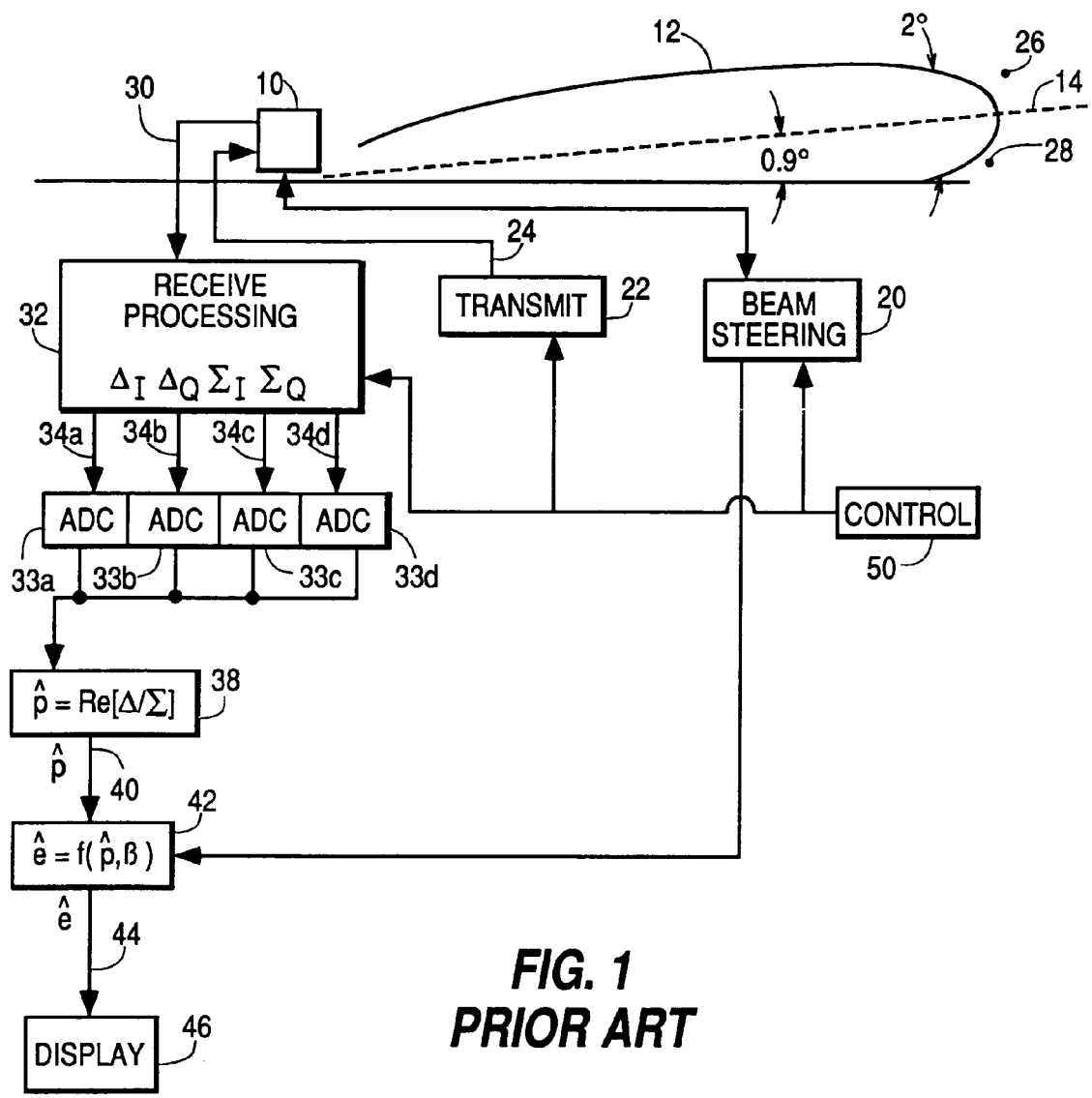
FIG. 1 is a simplified block diagram of a prior art conventional monopulse radar system directing a beam at a low elevation angle for forming an estimate of the elevation of a target.

In FIG. 1, the direction in which the main beam 12 (or plural main beams, not illustrated) of array antenna 10 is directed is controlled by beam steering arrangements illustrated together as a block 20. Such beam steering arrangements control phase shifters (not illustrated) associated with antenna 10 in a predetermined manner, and are well known in the art. A transmitter illustrated as a block 22 is connected with antenna 10 by one or more paths illustrated together as a path 24 for coupling signals to antenna 10, which in turn transmits the signals in the form of electromagnetic radiation. The signals produced by transmit block 22 may be simple, constant-frequency pulses, as described for example in the text Principles of Radar, by Reintjes & Coate, published by McGraw-Hill, 1952. As an alternative, frequency-jumped pulses may be used, as described in U.S. patent application Ser. No. 266,757 filed Nov. 3, 1988, or continuous-wave signals of varying frequency may be used.

The transmitted signal is directed at an angle above the horizon (an elevation angle) of approximately one-half of the 3 dB beamwidth, as described above. In FIG. 1, the 3 dB antenna beamwidth is 2° and the elevation angle is 0.9°. Some of the transmitted energy is intercepted by and is reflected from the target, which may be above or below the center line of beam 12, as illustrated by targets 26 and 28, respectively, of FIG. 1. The reflected energy is received by antenna 10 after a delay, and the received signals are coupled over a path or paths illustrated together as 30 to signal processing circuits illustrated as a block 32. Processing block 32 generates the real and imaginary parts of the sum (Σ) and difference (Δ) signals. The four signals produced by block 32 on conductors 34a, 34b, 34c and 34d are the real part of the difference signal ($\Delta_I$), the imaginary part of the difference signal ($\Delta_Q$), the real part of the sum signal ($\Sigma_I$) and the imaginary part of the sum signal ($\Sigma_Q$), respectively. The four outputs of block 32 are connected to a bank 33 of four corresponding analog-to-digital converters (ADCs) 33a, 33b, 33c and 33d.

In response to timing signals from a controller 50, the bank of ADCs 33 simultaneously converts the amplitude of each of the four signals into four separate binary (digital) values. In a typical system, bank of ADCs 33 may provide each amplitude in the form of a seven bit magnitude and a sign bit. The resulting eight-bit outputs can range in value from minus 128 to plus 128. Each time the controller activates the ADCs, each of these converters provides a new value at its output and as a group these ADCs together provide a new set of these four values. The set of four digital values is provided to a further processing block 38 in which $\hat{\rho}$, which is termed the conventional "monopulse", is calculated as the real part of the quotient of $\Delta/\Sigma$, $$\hat{\rho} = \text{Re}(\Delta/\Sigma) = \frac{\Delta_Q \Sigma_I - \Delta_I \Sigma_Q}{\Sigma_I^2 + \Sigma_Q^2} \quad (1)$$

The resulting $\hat{\rho}$ digital value is applied over a path 40 to a further processing block 42 in which the corrected monopulse elevation angle estimate ê is calculated $$\hat{e} = f(\hat{\rho}, \beta) \quad (2)$$

where f is a known calibration function and β is the beam steering angle. The corrected monopulse elevation estimate ê is applied over a path 44 to a display 46, together with range and bearing information, not illustrated.

Figure 5:
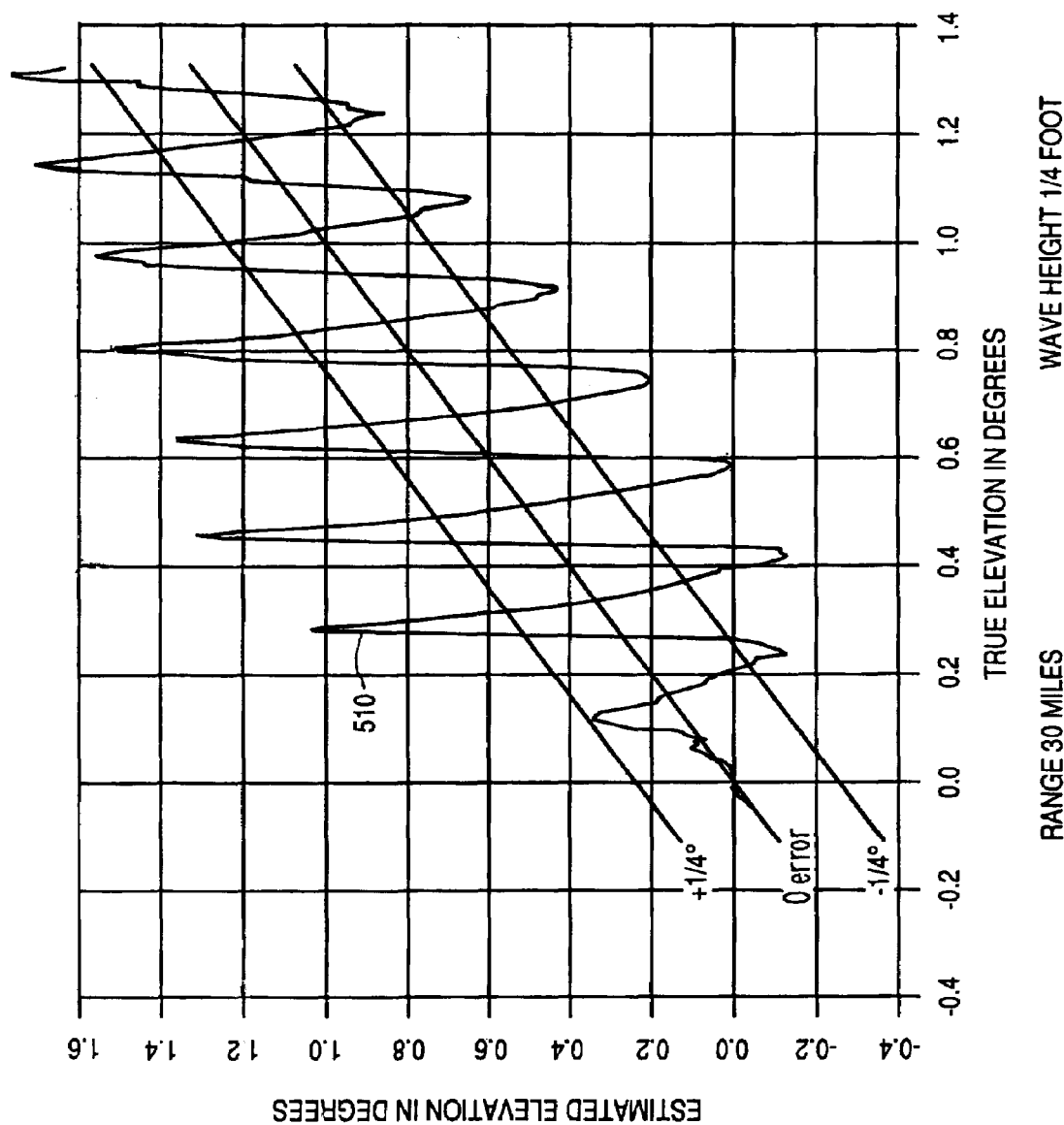
FIGS. 5, 6 and 7 are computer-generated plots of estimated elevation angle in degrees versus true elevation angle in degrees, where the estimated angle is produced by the conventional monopulse radar system of FIG. 1 with 3 dB beamwidth of 2° directed at an elevation angle of +0.9° at a target at a range of 30 miles over seas with wave heights of ¼, 1 and 2 feet, respectively.
Figure 6:
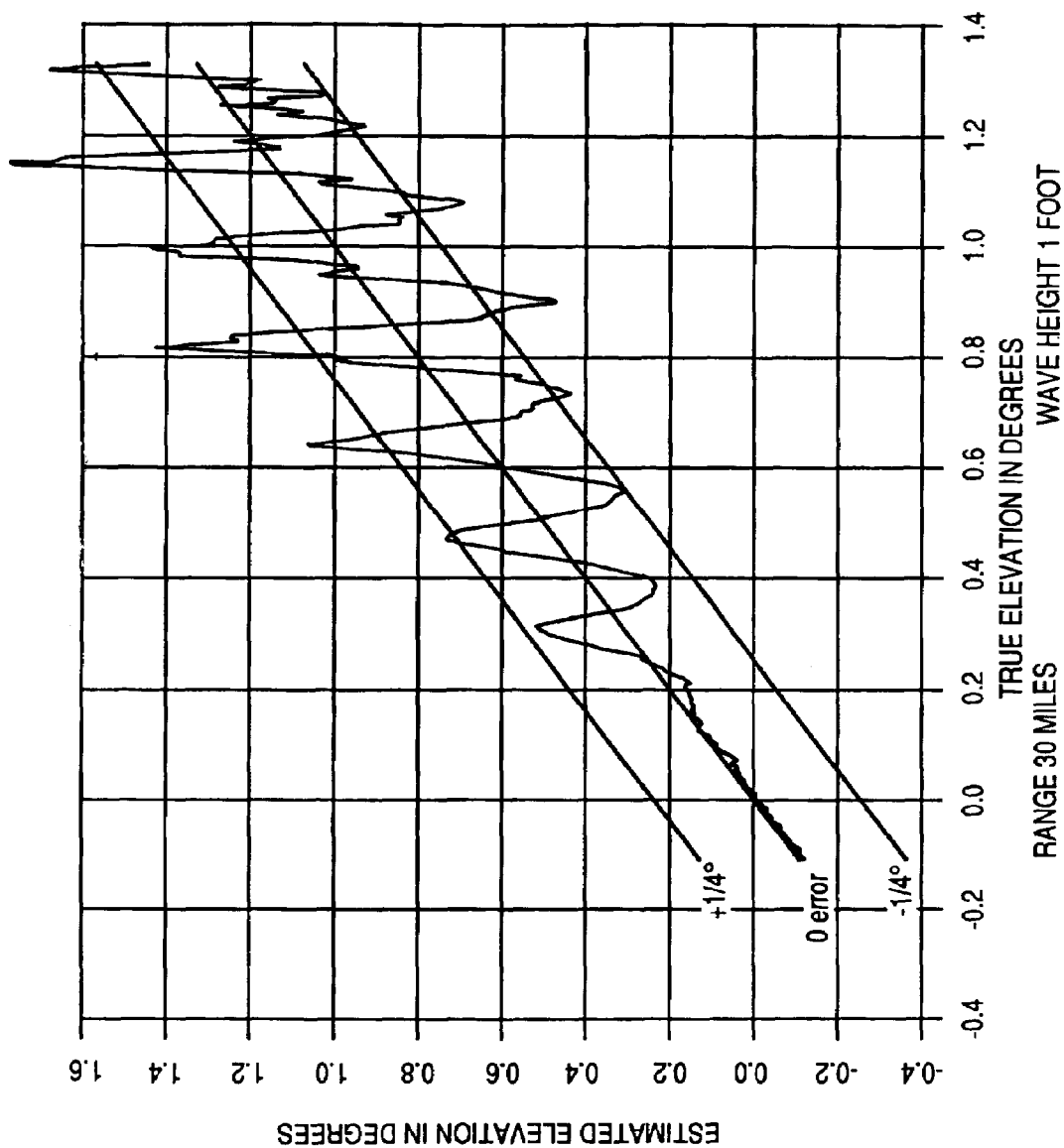
Figure 7:
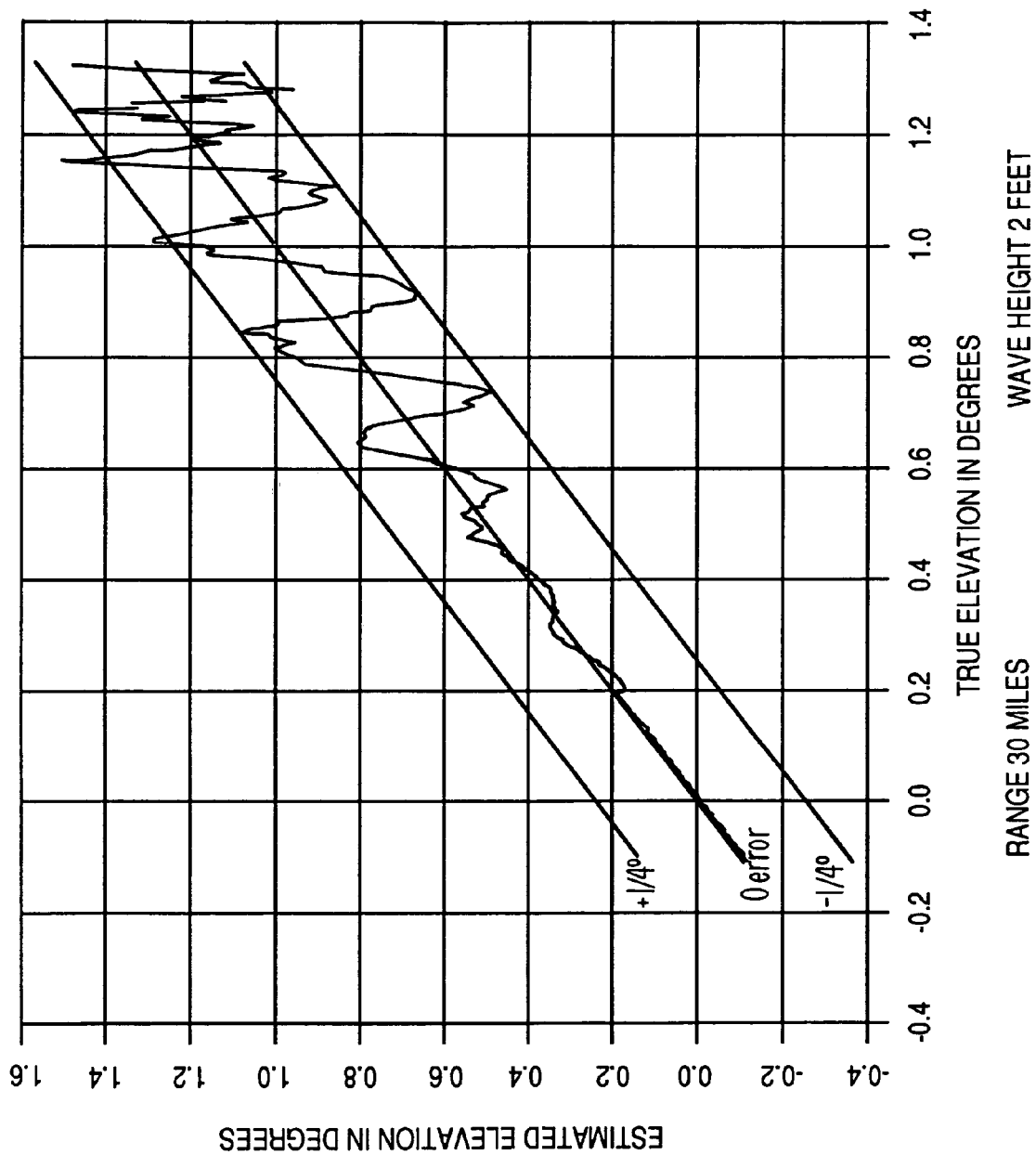

FIG. 5 includes a plot of estimated elevation angle ê in degrees versus true elevation angle in degrees. Plot 510 of FIG. 5 is calculated assuming a conventional monopulse system similar to that of FIG. 1 using frequency diversity, with a 3 dB antenna beamwidth of 2°, the center of which is located at 0.9° above the horizon at a frequency of 3 gigahertz (GHz) for wave heights of ¼ foot and with the target at a range of 30 miles. FIG. 6 is similar to FIG. 5 but for wave heights of 1 foot, and FIG. 7 is similar to FIG. 5 for wave heights of 2 feet. It should be noted that the simplifying assumption has been made in generating these plots that the wave structure is static over a period of time equivalent to about 10 milliseconds. Reference to FIG. 7 shows that at a range of 30 miles, with wave heights of 2 feet, the errors are generally less than ±¼°. However, for calmer seas, the errors may be substantially greater. Since wave height cannot be predicted in advance, reduced errors for all wave heights are desired.

Figure 8:
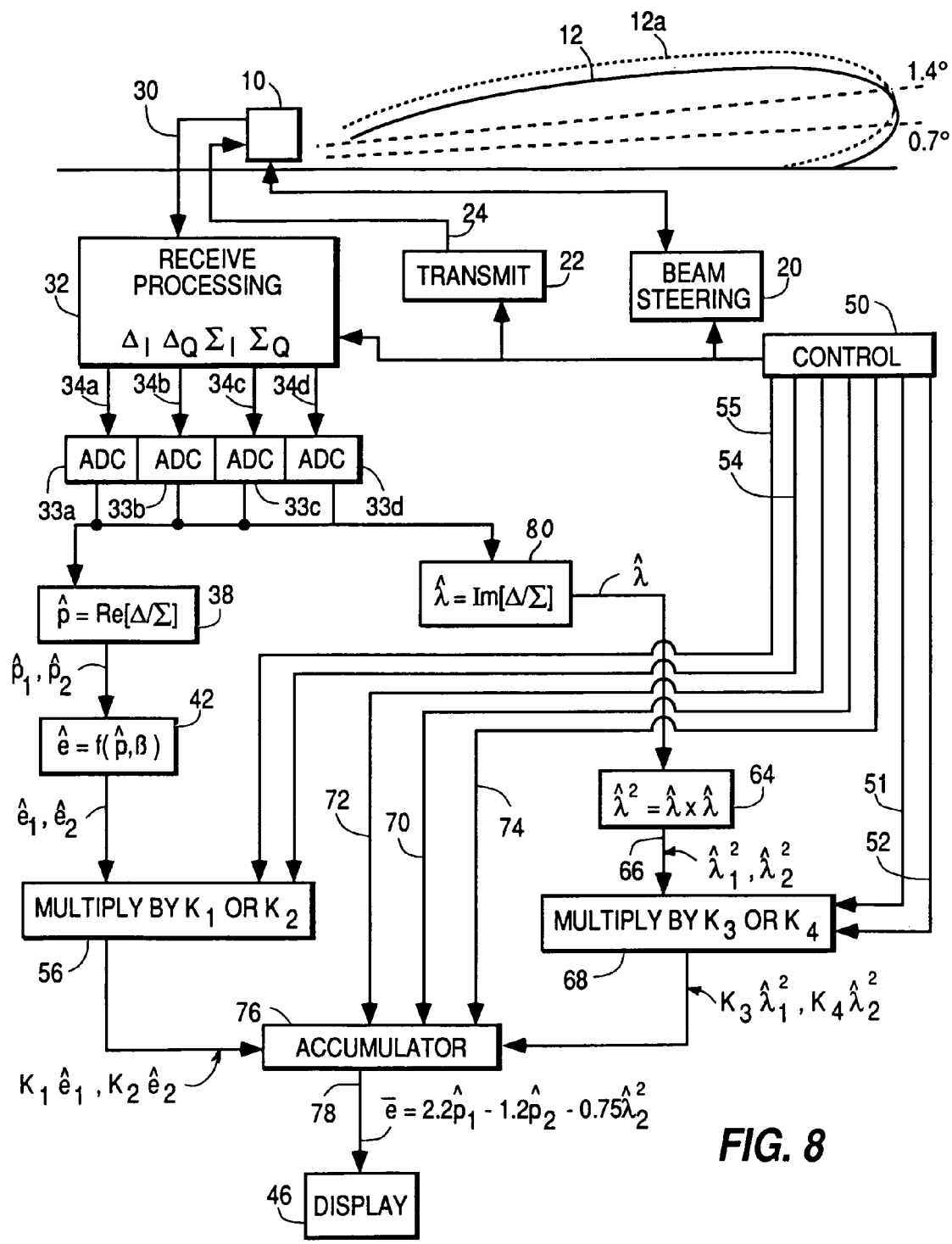
FIG. 8 is a simplified block diagram of a monopulse radar system including control and signal processing elements for processing signals from sequential antenna beams directed at different elevation angles in accordance with the invention.

FIG. 8 is generally similar to FIG. 1, and elements of FIG. 8 corresponding to those of FIG. 1 are designated by the same reference numerals. In FIG. 8, the four digital values from the four analog-to-digital converters 33a-33d which are provided to processing block 38 are also provided to a further signal processing block 80 which calculates $\hat{\lambda}$ as:

$$\hat{\lambda} = \text{Im}(\Delta/\Sigma) = \frac{\Delta_I \Sigma_I - \Delta_Q \Sigma_Q}{\Sigma_I^2 + \Sigma_Q^2} \quad (3)$$

The resulting $\hat{\lambda}$ digital value is applied to a further signal processing block 64. Signal processing block 64 is a digital multiplier which multiplies the $\hat{\lambda}$ received from signal processing block 80 by itself to produce a digital value $\hat{\lambda}^2$ which is the square of the digital value $\hat{\lambda}$. The $\hat{\lambda}^2$ produced by signal processing block 64 is further applied to another digital multiplier illustrated as a block 68. Controller 50 controls the operation of signal processing block 68 by sending control signals over control lines 51 or 52 but not over both simultaneously. When controller 50 sends a control signal over control line 51, signal processing block 68 responds by multiplying the digital value $\hat{\lambda}^2$ from processing block 64 by a first predetermined constant K3. When controller 50 sends a control signal over control line 52, signal processing block 68 multiplies the digital value $\hat{\lambda}^2$ by a second predetermined constant K4.

Also in FIG. 8, the ê produced by signal processing block 42 is applied to a signal processing block 56. Controller 50 controls the operation of signal processing block 56 by sending control signals over a control line 54 or over a control line 55, but not over both simultaneously. When signal processing block 56 receives a control signal from controller 50 over control line 54, signal processing block 56 multiplies ê by constant K1. When signal processing block 56 receives a control signal from controller 50 over control line 55, signal processing block 56 multiplies ê by constant K2.

Controller 50 also controls the operation of a digital accumulator illustrated as 76. The digital accumulator stores a digital value. Upon command by the controller, it adds the stored digital value to the value of a selectable one of the digital inputs of accumulator 76. When the addition is complete, accumulator 76 once again stores the resultant sum. Controller 50 controls signal processing block 76 by sending control signals over control lines 70 and 72 and over reset control line 74. When accumulator 76 receives a control signal over control line 74, accumulator 76 resets its stored digital value to zero. When accumulator 76 receives a control signal over control line 70, it adds the digital value (either K1ê or K2ê) from signal processing block 56 to the digital value already stored in the accumulator and again stores the resultant sum by overwriting the previously stored sum. When accumulator 76 receives a control signal over control line 72 it adds the digital value from signal processing block 68 (either K3$\hat{\lambda}_1^2$ or K4$\hat{\lambda}_2^2$) to the value already stored in the accumulator and stores the resultant sum.

In operation, controller 50 of FIG. 8 controls the beam steering circuit 20 to cause antenna 10 to direct a received beam 12, for example first at a 1.4° (upper) angle as illustrated by dotted outline 12a in FIG. 8, and then at the 0.7° (lower) angle. During that time when antenna 10 is directed at the upper 1.4° angle, controller 50 causes a transmitter pulse to be transmitted which is ultimately reflected from the target (not illustrated in FIG. 8). Signals received from the target pass through antenna 10 by way of the upper beam to receiver processor 32 for producing $\Delta_I$, $\Delta_Q$, $\Sigma_I$ and $\Sigma_Q$ signals. The digitized $\Delta_I$, $\Delta_Q$, $\Sigma_I$ and $\Sigma_Q$ signals are processed by conventional monopulse processors 38 and 42 to produce a first ê digital value designated $\hat{e}_1$. The $\Delta$ and $\Sigma$ signals are also processed by signal processing blocks 80 and 64 to produce a first $\hat{\lambda}_2$ digital value designated $\hat{\lambda}_1^2$. Controller 50 sends a control signal over line 74 which resets the value in accumulator 76 to zero. Controller 50 then sends a control signal over control line 54 to signal processing block 56 which causes $\hat{e}_1$, from signal processing block 42 to be multiplied by K1. At the same time, controller 50 sends a control signal over line 51 to signal processing block 68, which causes $\hat{\lambda}_1^2$ from processing block 64 to be multiplied by K3. Controller 50 then sends a control signal over control line 70 to accumulator 76 which causes the value K1$\hat{e}_1$ from signal processing block 56 to be stored in the accumulator. Controller 50 then sends a control signal over control line 72 to accumulator 76 which causes the value K3$\hat{\lambda}_1^2$ to be added to the current stored value K1$\hat{e}_1$, and to cause the accumulated value K1$\hat{e}_1$+K3$\hat{\lambda}_1^2$ to be stored in the accumulator.

Controller 50 then directs beam steering circuit 20 to cause antenna 10 to direct its beam at the lower 0.7° elevation angle, and causes a transmitter pulse. This may occur following the processing of signals related to the upper, 1.4° position of the beam produced by antenna 10. Signals are received by antenna 10 from the target (not illustrated in FIG. 8) and $\Sigma$ and $\Delta$ signals are again produced on conductor set 34 by receiver processing circuit 32. Conventional monopulse processing blocks 38 and 42 calculate a new value of ê which is designated $\hat{e}_2$, and signal processing blocks 80 and 64 calculate a new value for $\hat{\lambda}^2$ which is designated $\hat{\lambda}_2^2$. Controller 50 then sends control signals over control lines 52 and 55 to signal processing blocks 56 and 68, respectively, which causes $\hat{e}_2$ from processing block 42 to be multiplied by K2, and which also causes $\hat{\lambda}_2^2$ from processing block 64 to be multiplied by K4. Controller 50 then sends a control signal over control line 70 to accumulator 76 which causes K2 $\hat{e}_2$ from processing block 56 to be added to the sum K1 $\hat{e}_1$+K3 $\hat{\lambda}_1^2$ already stored in the accumulator and causes the resultant sum K1 $\hat{e}_1$+K2 $\hat{e}_2$+K3 $\hat{\lambda}_1^2$ to be stored in the accumulator. Controller 50 then sends a control signal over control line 72 to accumulator 76 which causes K4$\hat{\lambda}_2^2$ from processing block 68 to be added to the accumulator which produces a corrected elevation angle estimate:

$$\overline{e} = K1\hat{e}_1 + K2\hat{e}_2 + K3\hat{\lambda}_1^2 + K4\hat{\lambda}_2^2$$

which is applied to display 46. A particularly advantageous set of constants for a particular application has been found to be K1=2.2, K2=−1.2, K3=−0.75, and K4=0.

Figure 9:
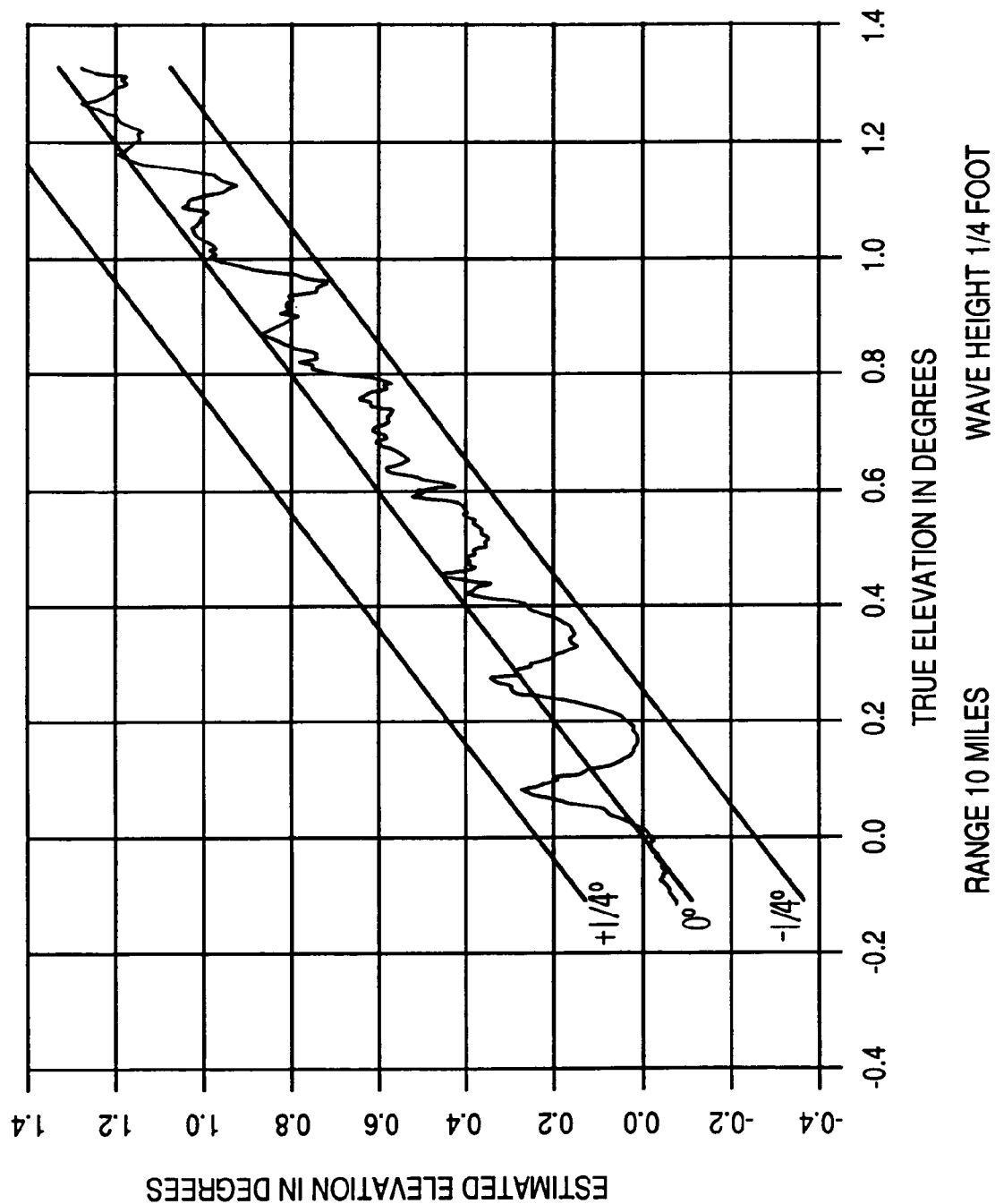
FIGS. 9, 10 and 11 are computer-generated plots of estimated elevation angle in degrees versus true elevation angle, where the estimated angle is produced by the monopulse radar arrangement of FIG. 8 with plural beams, each having 2° 3 dB beamwidth, the upper beam being directed at a 1.4° elevation angle and the lower beam being directed at a 0.7° elevation angles, for wave heights of ¼ foot at ranges of 10, 20 and 30 miles, respectively.
Figure 10:
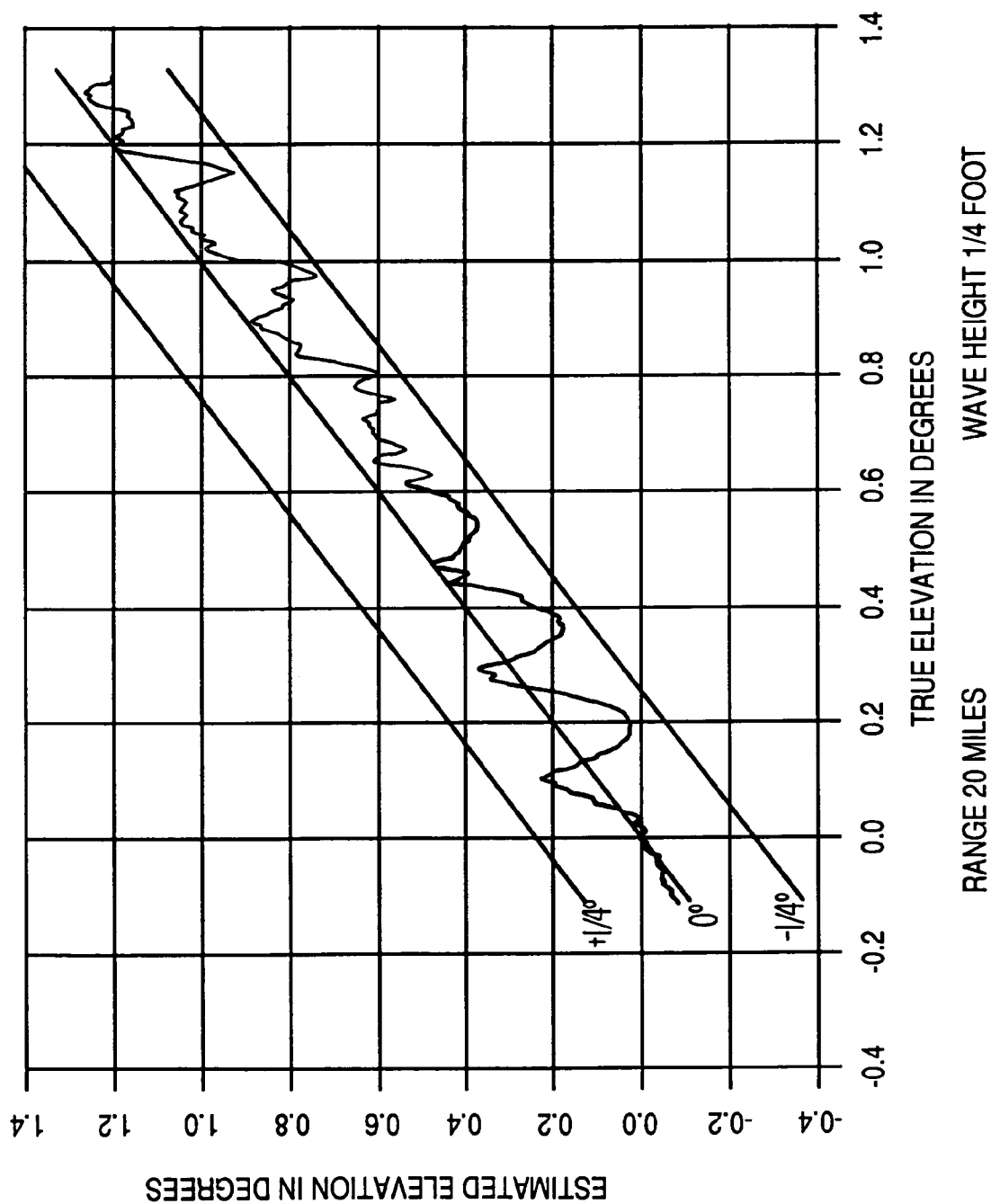
Figure 11:
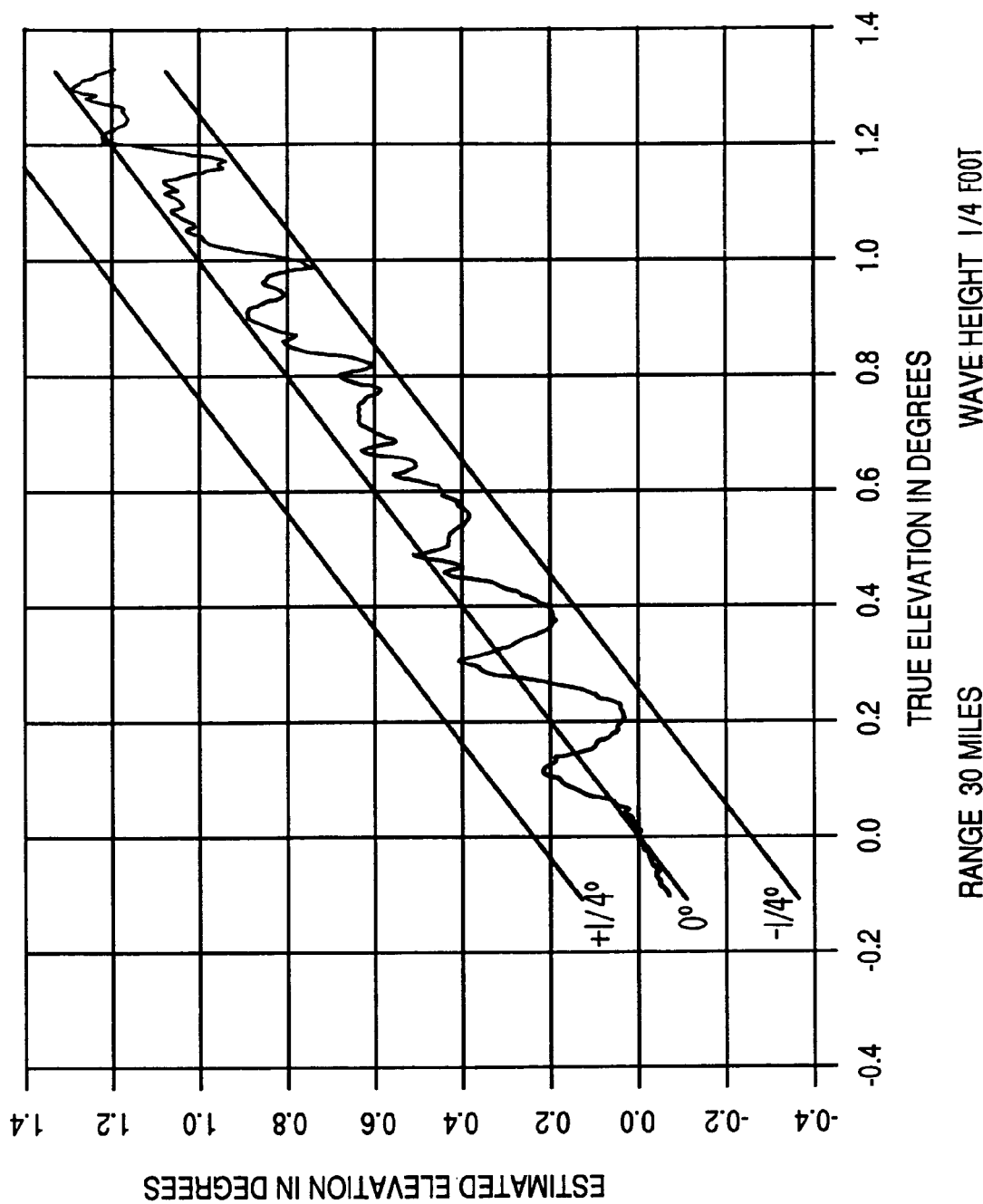
Figure 12:
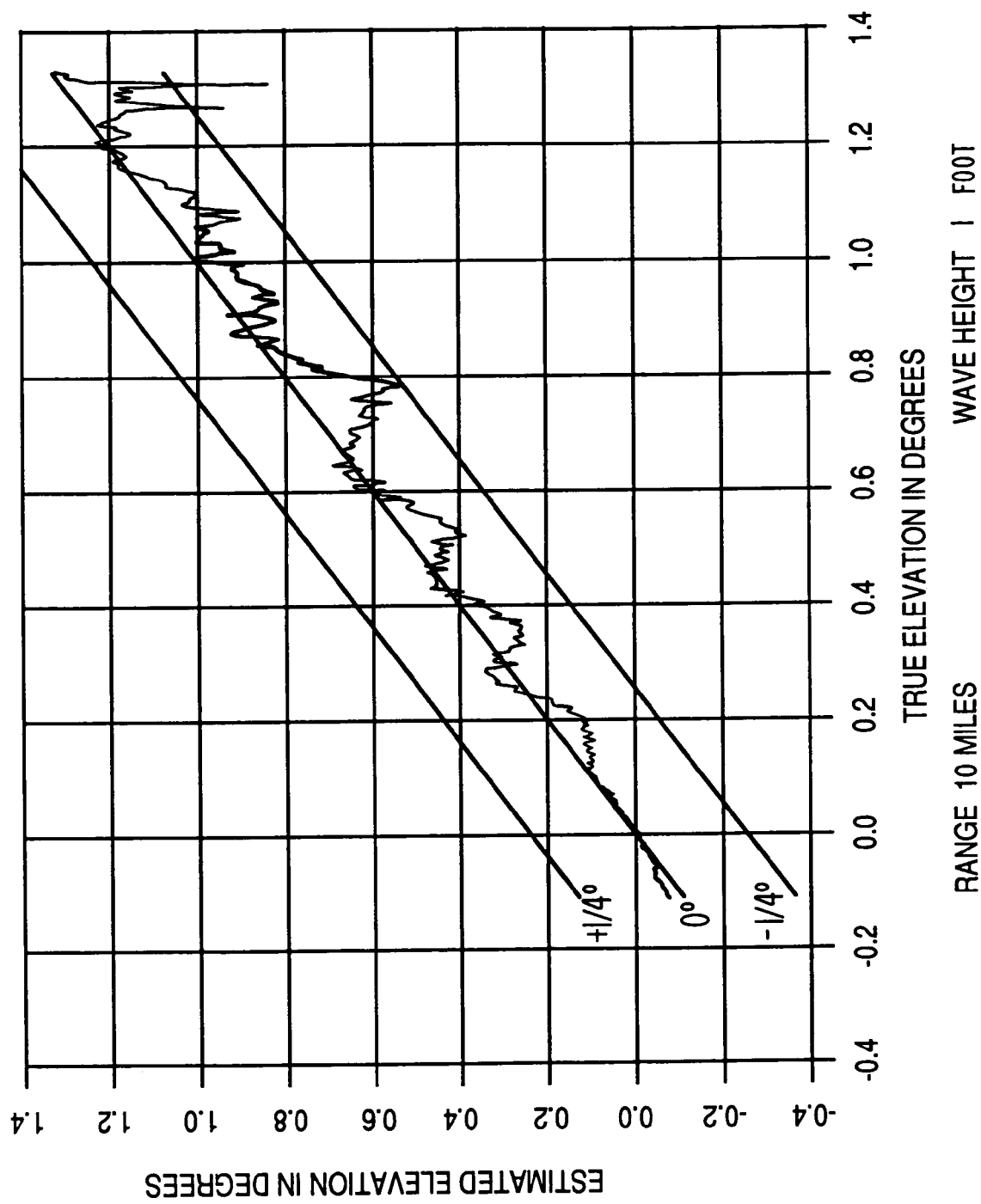
FIGS. 12, 13 and 14 are computer-generated plots of estimated elevation angle versus true elevation angle, similar to the plots of FIGS. 9, 10 and 11, for wave heights of 1 foot and ranges of 10, 20 and 30 miles, respectively.
Figure 13:
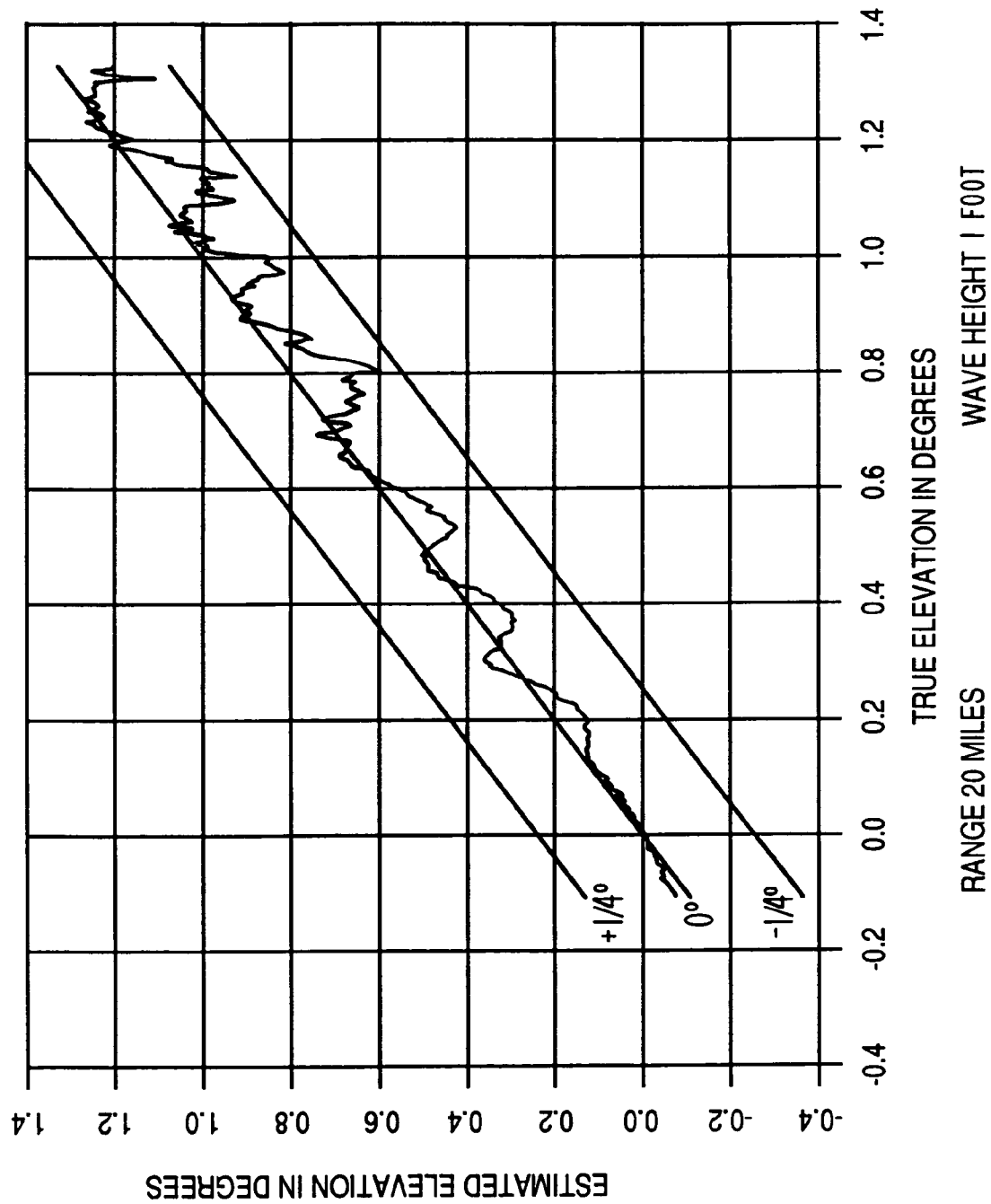
Figure 14:
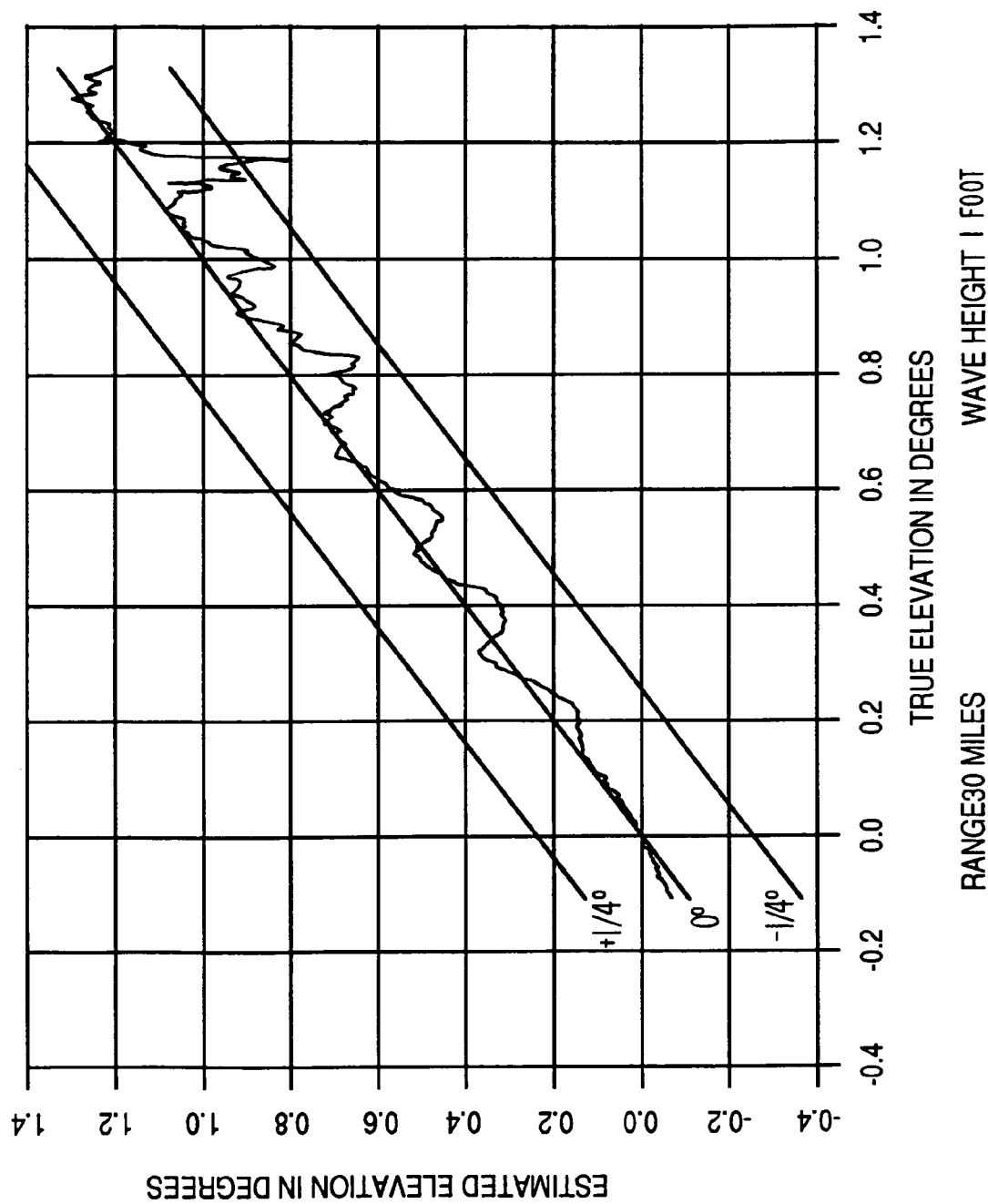
Figure 15:
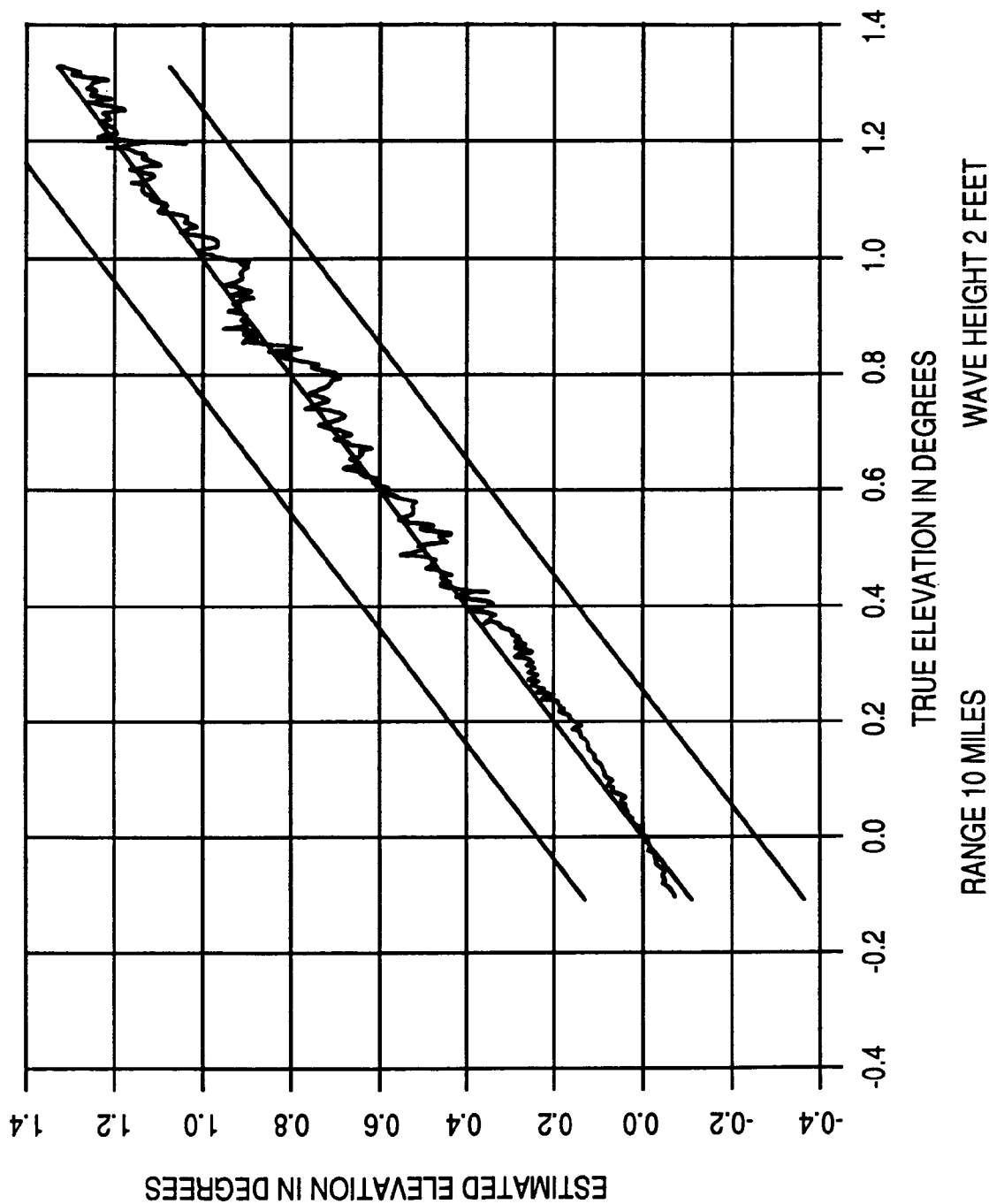
FIGS. 15, 16 and 17 are computer-generated plots of estimated elevation angle versus true elevation angle similar to FIGS. 9, 10 and 11, for wave heights of 2 feet and ranges of 10, 20 and 30 miles, respectively.
Figure 16:
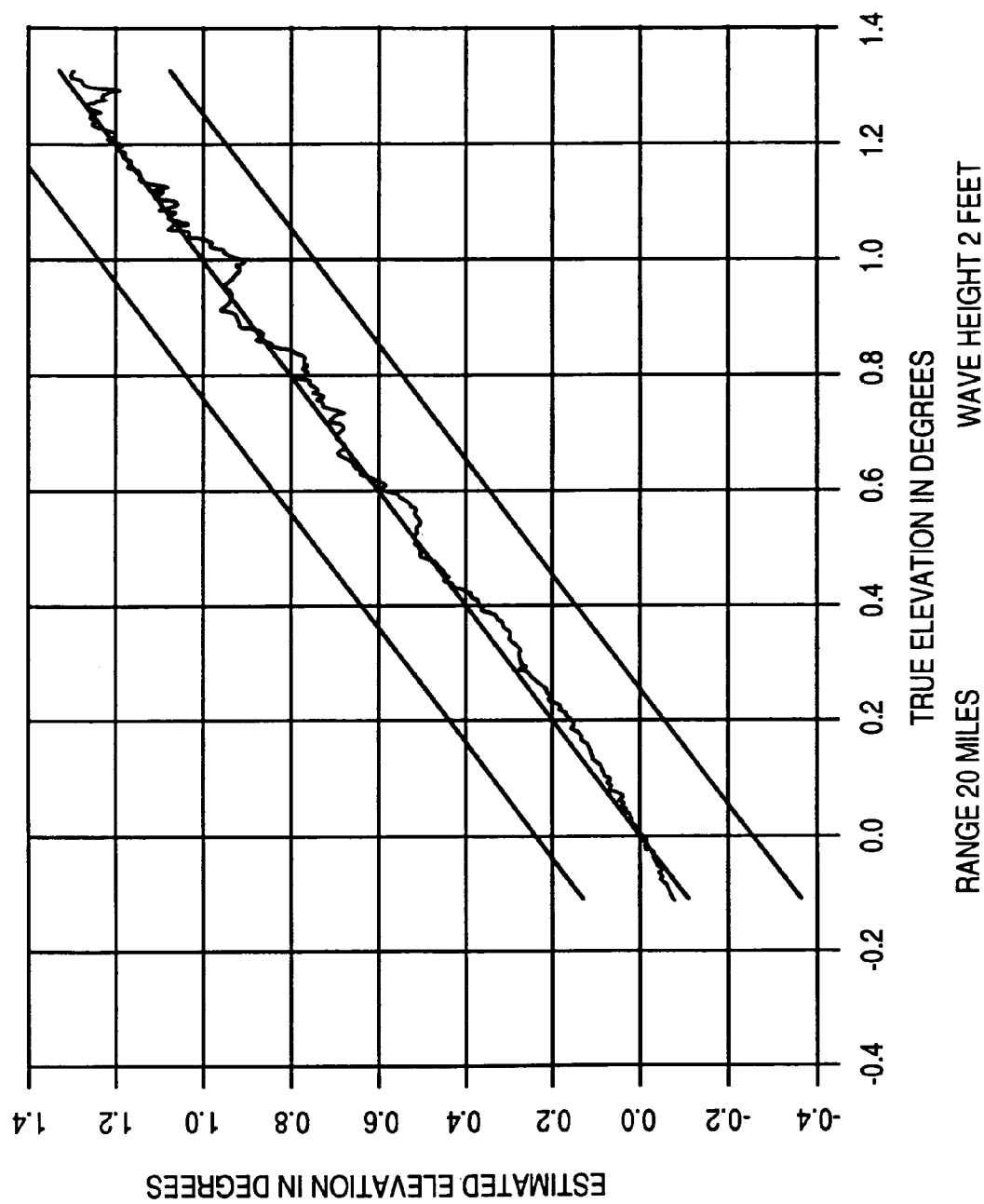
Figure 17:
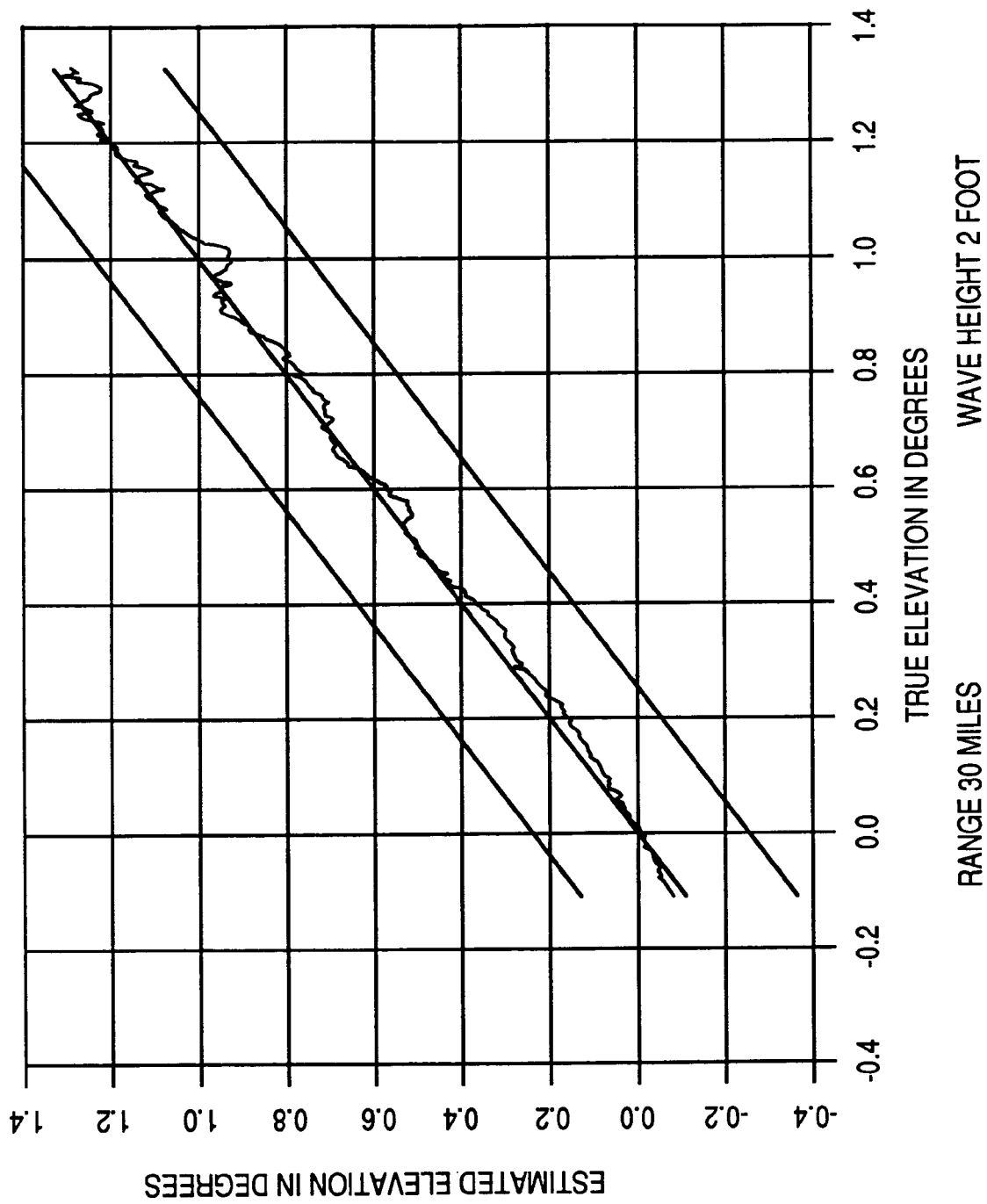

FIGS. 9, 10 and 11 illustrate plots of estimated elevation error $\overline{e}$ versus actual elevation using frequency-diversity pulses at ranges of 10, 20 and 30 miles, respectively, for wave heights of ¼ foot, calculated for the system of FIG. 8 operated as described. Comparison of FIG. 11 with FIG. 5 shows a marked improvement in the accuracy of the estimated elevation using the system of FIG. 8 by comparison with the prior art system of FIG. 1. FIGS. 12, 13 and 14, are similar to FIGS. 9, 10 and 11, respectively, except that the wave height is 1 foot. Comparison of FIG. 14 with FIG. 6 shows that the improvement in accuracy achieved by use of the arrangement of FIG. 8 is substantial. FIGS. 15, 16 and 17 are the same as FIGS. 9, 10 and 11, respectively, except that the wave height is 2 feet. Comparison of the plot of FIG. 17 with FIG. 7 shows that a considerable improvement in accuracy results from the use of the arrangement of FIG. 8 and the described operating method.

Figure 18:
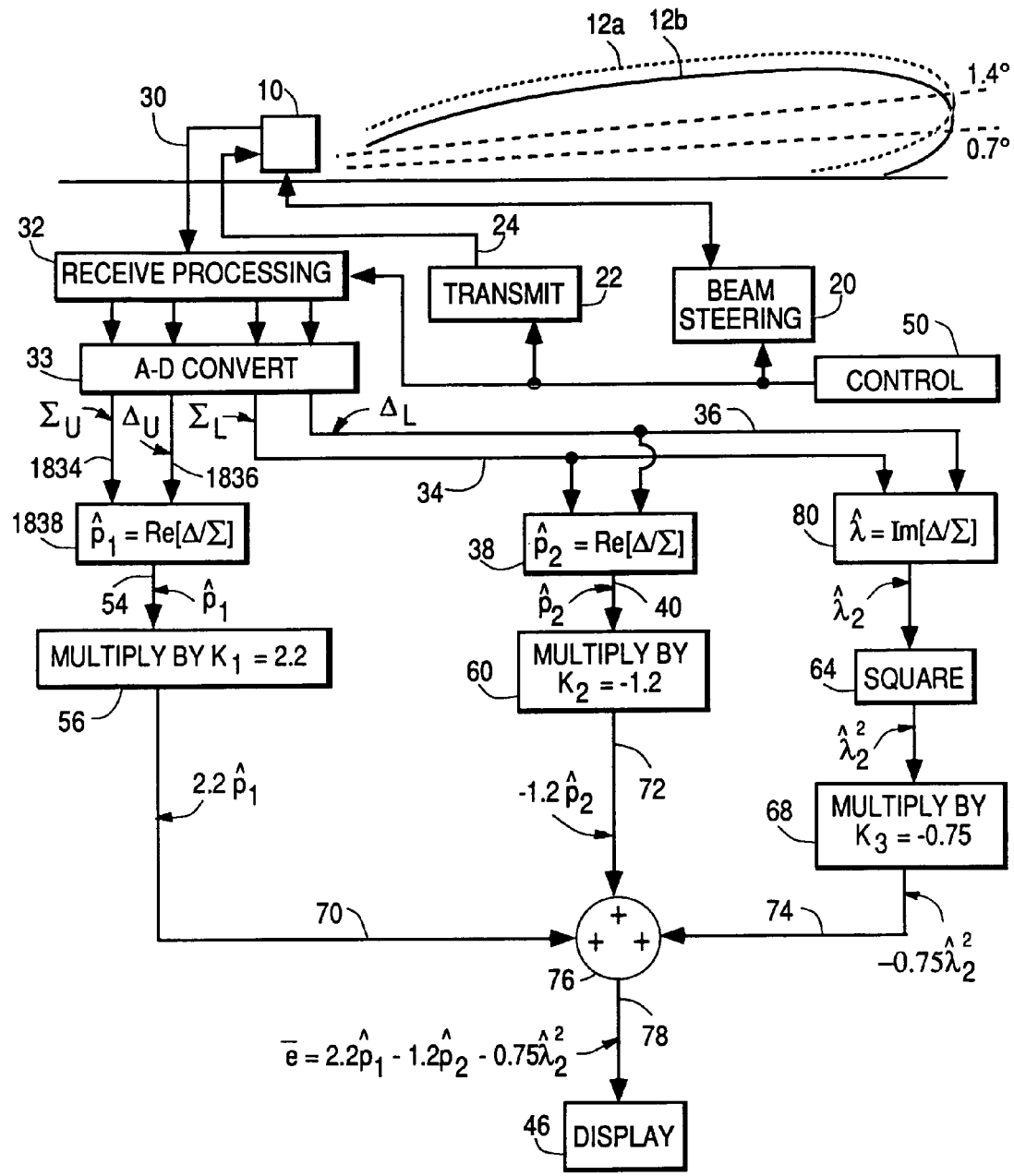
FIG. 18 is a simplified block diagram of a monopulse radar system in accordance with the invention in which processing of the signals from simultaneous antenna beams is performed.

Sophisticated prior art array antennas are capable of producing a single main beam or lobe, and are also capable of being operated in a mode in which several independently controllable beams or lobes can be generated simultaneously. Such antennas are associated with receive signal processors (32 of FIG. 8) which produce Σ and Δ signals for each of the beams produced by the antenna. FIG. 18 illustrates a monopulse radar system according to the invention which simultaneously produces pairs of antenna beams. Elements of FIG. 18 corresponding to those of FIG. 8 are designated by the same reference numerals.

In FIG. 18, antenna 10 directs two simultaneous beams 12a, 12b toward a target (not illustrated). The upper beam has a 2° 3 dB beamwidth and is directed at an elevation angle of +1.4°. The lower beam also has 2° 3 dB beamwidth and is directed at an elevation angle of 0.7°. Both are directed in the same azimuthal direction. A transmitter pulse may be emitted by one beam or by both. Receive signal processing block 32 produces $\Sigma_U$ and $\Delta_U$ signals for upper beam 12a, and $\Sigma_L$ and $\Delta_L$ for lower beam 12b. The $\Sigma_U$, $\Delta_U$, $\Sigma_L$ and $\Delta_L$ signals are sent to a bank of eight A-to-D converters illustrated together as a block 33. The first four A-to-D converters (not separately illustrated) convert the real and imaginary parts of $\Sigma_U$ and $\Delta_U$ to digital values and the second four convert the real and imaginary parts of $\Sigma_L$ and $\Delta_L$ to digital values.

The digital values for $\Sigma_U$ and $\Delta_U$ are provided to processing block 1838 for calculating $\hat{\rho}=R_e(\Delta_U/\Sigma_U)$. The digital values for $\Sigma_L$ and $\Delta_L$ are provided to processing blocks 38 and 80 for calculating $\hat{\rho}_2=R_e(\Delta_L/\Sigma_L)$ and $\hat{\lambda}=I_m(\Delta_L/\Sigma_L)$, respectively. The $\hat{\rho}_1$ signal from block 1838 is applied to a multiplier illustrated as 56 for multiplication by a constant K1. Similarly, the $\hat{\rho}_2$ signal from block 38 is applied to a multiplier illustrated as a block 60 for multiplication by a constant K2. The $\hat{\lambda}$ signal from block 80 is applied to a squaring processor illustrated as a block 64 to produce $\hat{\lambda}^2$, and thence to a multiplier 68 for multiplication by K3 to produce $K3\hat{\lambda}_2$. A summer 76 receives $K1\hat{\rho}_1$ from multiplier 56 by way of a data path 70, $K2\hat{\rho}_2$ from multiplier 60 by way of data path 72, and $K3\hat{\lambda}^2_2$ from multiplier 68 by way of data path 74, for adding them together and producing a sum on a data path 78 for application to display 46. For the exemplary values of K1=2.2, K2=1.2, K3=−0.75 and K4=0, the sum estimate produced by summer 76 is $$\bar{e}=2.2\hat{\rho}_1-1.2\hat{\rho}_2-0.75\hat{\lambda}^2_2$$

which is the same as the estimate $\bar{e}$ produced by the sequential-beam arrangement of FIG. 8. It should be noted that delays may be required at various points in the block diagrams to compensate for differences in the times required for the various computations in the various signal paths, so that corresponding signals arrive at summer 76 simultaneously. Such delays are so well known as to be notorious in the art.

The specific values for the constants K1, K2, K3 and K4 depend upon judgements relating to the optimum parameters such as desired range coverage and environment, and other values may be selected based upon other judgements. A given phase monopulse radar could be exposed both to environments where little electromagnetic energy is reflected from the earth's surface and consequently the reflected signal interferes little with the signal from the direct path, and to previously described environments where the interference from the reflected signal interferes strongly with the signal from the direct path. The embodiment of the invention which is illustrated in FIG. 19 calculates estimates of the elevation angle of a target which are accurate in environments in which the reflected signal is weak, as well as environments where the reflected signal interferes strongly.

Figure 19:
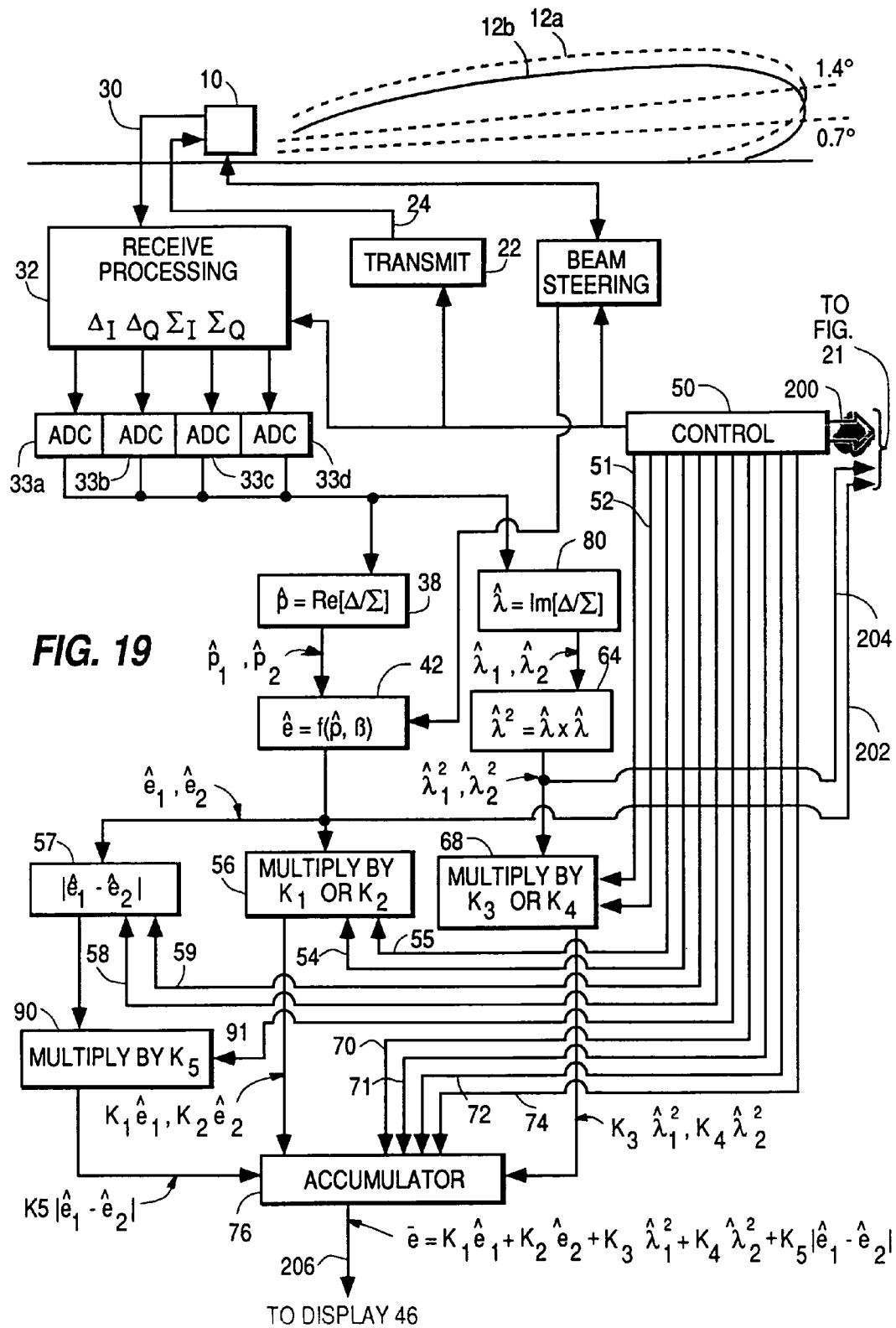
FIG. 19 is a simplified block diagram of another embodiment of the invention.

FIG. 19 is generally similar to FIG. 8, and elements of FIG. 19 corresponding to those of FIG. 8 are designated by the same reference numerals. In FIG. 19, processing proceeds in the same manner as that described for the arrangement of FIG. 8 through the processing performed by blocks 42 and 64, which sequentially generate $\hat{e}$ and $\hat{\lambda}_2$ samples for the upper and lower beams. The $\hat{\lambda}^2$ signals from block 64 are applied to a multiplier 68 at the next level of processing, for multiplication by either K3 or K4 under control of controller 50 by way of consideration 51 or 52, just as in the arrangement of FIG. 8. The sequential $\hat{e}_1$ and $\hat{e}_2$ signals produced by block 42, however, are applied to a further processing block illustrated as 57, as well as to multiplier 56, which multiplies by either K1 or K2 under control of control block 50 by way of conductors 54 or 55, also as described above.

In FIG. 19, controller 50 controls the operation of signal processing block 57 by sending control signals over control lines 58 or 59, but not over both simultaneously. When controller 50 sends a control signal over control line 58, signal processing block 57 responds by storing the digital value $\hat{e}_1$ or $\hat{e}_2$ received from signal processing block 42. When controller 50 sends a control signal over control line 59, signal processing block 57 responds by first subtracting the digital value $\hat{e}_1$ or $\hat{e}_2$ currently received from signal processing block 42 from any digital value previously stored in processing block 57, and second, if the digital value resulting from the subtraction is less than zero, reversing the sign of said digital value to form the digital value $|\hat{e}_1-\hat{e}_2|$, the absolute value of the difference between the digital value currently received from processing block 42 and the digital value previously stored in processing block 57. The memory of block 57 is also reset to zero following each completed calculation.

The absolute value produced by signal processing block 57 is applied to a multiplier illustrated as a block 90. Block 90 is enabled by controller 50 over a conductor 91, for multiplying the received absolute value by a constant K5 to produce $K5|\hat{e}_1-\hat{e}_2|$, which is made available to accumulator 76.

In operation of the embodiment of FIG. 19, accumulator 76 accumulates $K1\hat{e}_1+K3\hat{\lambda}^2$, during a first portion of a cycle of operation, as described in conjunction with FIG. 8. Also during this first portion of the cycle, block 57 is controlled over control line 58 to store the current value of $\hat{e}_1$. During the second portion of the cycle, multiplier 56 produces $K2\hat{e}_2$ and multiplier 68 produces $K4\hat{\lambda}^2_2$, as previously described in relation to FIG. 8. While accumulator 76 begins to accumulate $K2\hat{e}_2$ from block 56 and $K4\hat{\lambda}^2_2$ from block 68, block 57 is controlled over conductor 59 to subtract $\hat{e}_2$ from $\hat{e}_1$, and invert as necessary, and block 90 is controlled over conductor 91 to produce $K5|\hat{e}_1-\hat{e}_2|$. When the output from multiplier 90 is available, accumulator 76 is controlled over conductor 71 to perform the final accumulation of type cycle to produce an elevation estimate $$\bar{e}=K1\hat{e}_1+K2\hat{e}_2+K3\hat{\lambda}^2_1+K4\hat{\lambda}^2_2+K5|\hat{e}_1-\hat{e}_2|$$

and is reset in readiness for another cycle.

The estimate $\bar{e}$ is made available to display 46 by way of a path 206.

The accuracy of the elevation estimate produced in FIG. 19 is limited in some environments, such as a smooth sea surface where the reflection interferes very strongly with the direct path, because the exact functional relation between the true target elevation e, and the measurements $\hat{e}_1$, $\hat{e}_2$, $\hat{\lambda}^2_2$ and $\hat{\lambda}^2_2$ is nonlinear. A more precise estimate of the true elevation e is made by the embodiment of the invention illustrated in FIG. 20.

Figure 20:
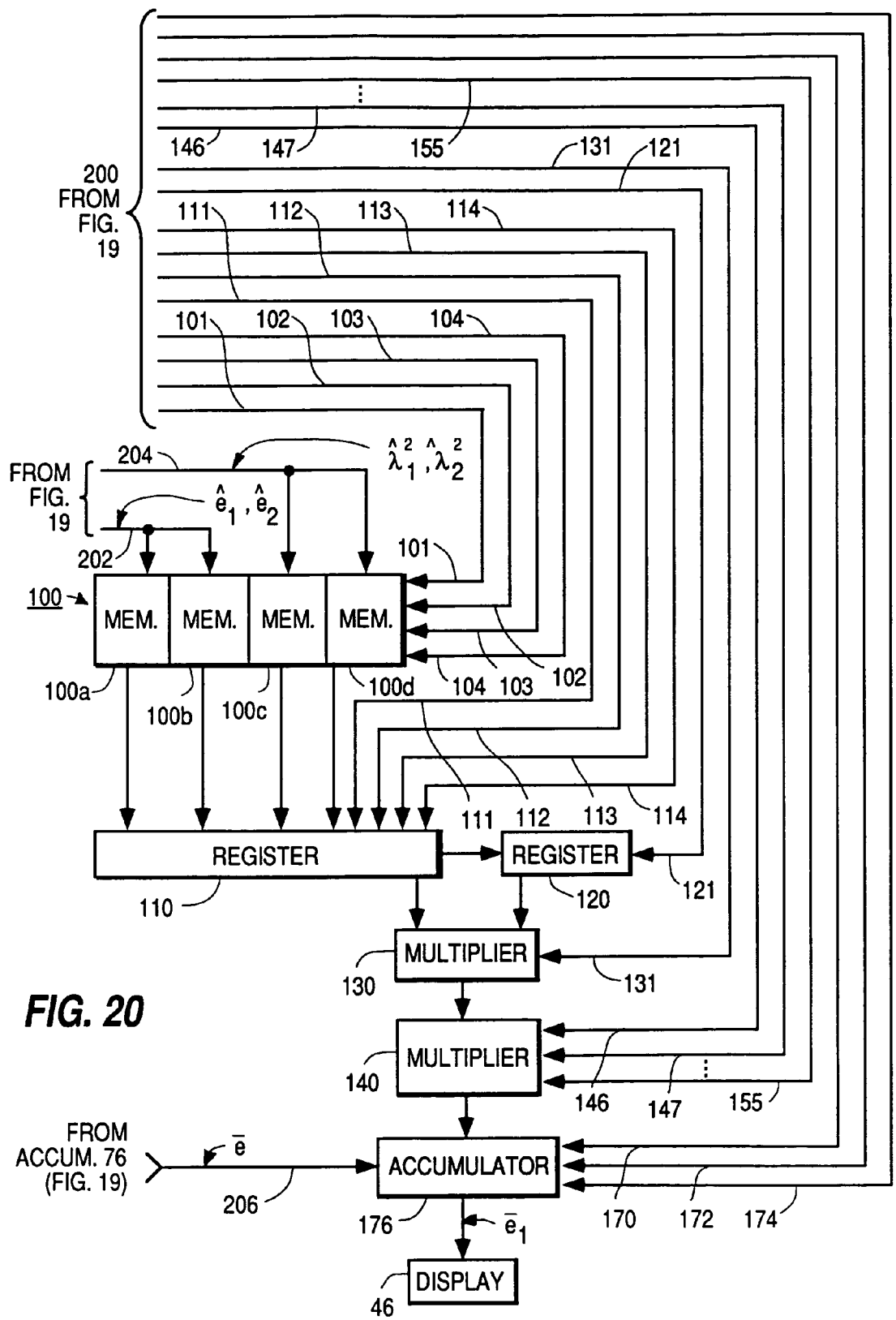
FIG. 20 is a simplified block diagram of an addition to or modification of the arrangement of FIG. 19 to provide improved accuracy over a wider range of conditions.
Figure 21:
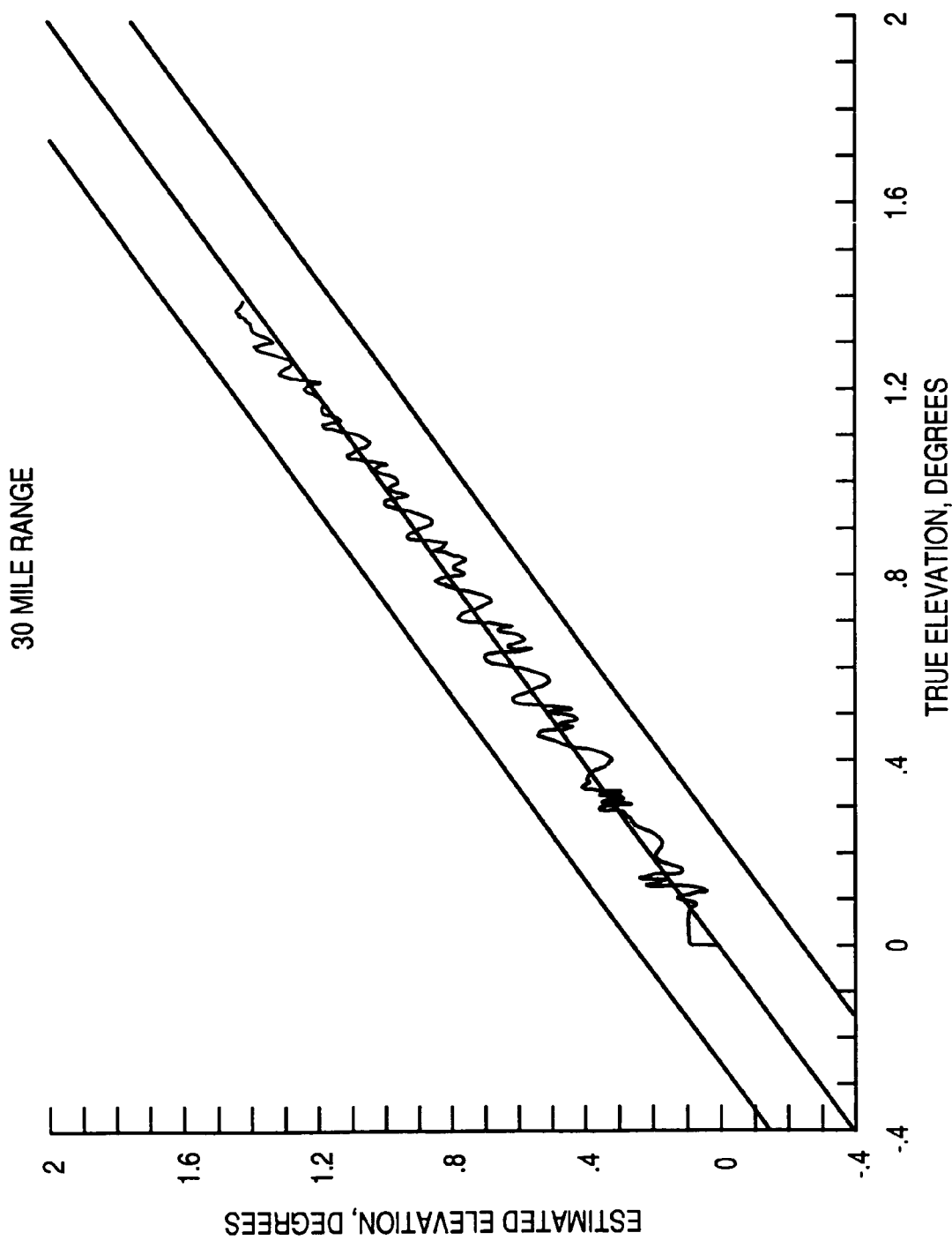
FIG. 21 is a plot of estimated elevation versus time elevation for the arrangement of FIGS. 19 and 20 for a flat sea at 30-mile range.

The arrangement of FIG. 20 constitutes an embodiment of the invention which may be viewed as an addition or modification of the arrangement of FIG. 19. In particular, the processing arrangement of FIG. 20 receives certain inputs by way of data paths 200, 202 and 204 of FIG. 19, and also receives the processed $\bar{e}$ signal from accumulator 76 of FIG. 19, add further corrections to the processed $\bar{e}$ signal received from accumulator 76 of FIG. 19 to generate a refined elevation estimate designated $\bar{e}_1$, which is made available to display 46 of FIG. 19.

In FIG. 20, signals from controller 50 (FIG. 19) applied over control lines 101, 102, 103 and 104 of data bus 200 control the operation of memory locations 100a, 100b, 100c and 100d, respectively, of a memory designated generally as 100. Signals $\hat{e}_1$ and $\hat{e}_2$ become available from processing block 42 (FIG. 19) by way of data path 202. Memory locations 100a and 100b are sequentially enabled to store $\hat{e}_1$ and $\hat{e}_2$, respectively, during the first and second halves, respectively, of the cycle described in conjunction with FIG. 19. Similarly, memory locations 100c and 100d are coupled to a data path 204, by which signals $\hat{\lambda}^2_1$ and $\hat{\lambda}^2_2$ are received from processing block 64 (FIG. 19). Memory locations 100c and 100d are sequentially enabled by enabling signals applied from controller 50 over control lines 103 and 104, respectively, for storing $\hat{\lambda}^2_1$ in memory location 100c and $\hat{\lambda}^2_2$ in memory location 100d. The signals stored in the memory locations of memory 100 are made available to a register 110.

Register 110 of FIG. 20 is controlled by signals applied over control lines 111, 112, 113 and 114 of data bus 200 from controller 50 (FIG. 19). When a signal is applied over control line 111, register 110 stores the signal currently stored in memory location 100a of memory 100. Similarly, register 110 stores one of the signals from memory location 100b, c or d in response to signals applied over control lines 112, 113 or 114, respectively. A further register 120 is coupled to register 110 and is controlled by way of a control line 121 for storing the contents of register 110. The signals stored by both registers 110 and 120 are made available to a multiplier illustrated as a block 130. Upon a command applied over a control line 131 of data bus 200 from controller 50 (FIG. 19), multiplier 130 multiplies the value received from register 110 by the value received from register 120 to form a product. The product is applied to a further multiplier illustrated as a block 140, which is controlled by a plurality of control lines 146, 147 . . . 155, for, in response to the control signal configuration, multiplying the product received from multiplier 130 by one of a like plurality of predetermined constants. For example, when control line 146 is activated, multiplier 140 multiplies the product received from multiplier 130 by a constant K6. Likewise, when any one of the control lines 147 . . . 155 is activated, multiplier 140 multiplies by one of predetermined constants K7 through K15, respectively. The product produced by multiplier 140 is applied to an accumulator 176, which also receives signal $\bar{e}$ from accumulator 76 of FIG. 19 by way of data path 206.

Accumulator 176 of FIG. 20 is controlled by a pair of control lines 170 and 172, and by a reset line 174. Before the beginning of each cycle of operation, control line 174 is activated by controller 50 (FIG. 19) to reset the accumulator to zero. When accumulator 176 receives a control signal over control line 170, it adds the digital value of $\hat{e}$ received by way of data path 206 to the digital value already stored in accumulator 176. When accumulator 176 receives a control signal over control line 172, it adds the digital value from multiplier 140 to the digital value already stored in accumulator 176.

In operation of the arrangement of FIGS. 19 and 20, the operation of FIG. 19 may be assumed to proceed as described above. When signal $\hat{e}_1$ is generated by processing block 42 of FIG. 19, controller 501 in addition to enabling processing block 57 for storing $\hat{e}_1$, also enables memory location 100a (FIG. 20) for storage of $\hat{e}_1$. During that time in which $\hat{\lambda}^2_1$ is produced by processing block 64 of FIG. 19, controller 50 also enables memory location 10c (FIG. 20) for storage of $\hat{\lambda}^2_1$. Also, controller 50 controls memory locations 100b and 100d during the second half of each operating cycle to store $\hat{e}_2$ and $\hat{\lambda}^2_2$, respectively.

Preferably during the period in which the arrangement of FIG. 19 is processing to produce the estimate $\bar{e}$ at the output of accumulator 76, the arrangement of FIG. 20 processes signals through registers 110, 120, 130 and 140. For ease of explanation, assume that accumulator 76 of FIG. 1 produces its output $$\bar{e} = K1\hat{e}_1 + K2\hat{e}_2 + K3\hat{\lambda}^2_1 + K4\hat{\lambda}^2_2 + K5|\hat{e}_1 - \hat{e}_2|$$

before processing begins in the arrangement of FIG. 20. With this assumption, accumulator 176, after being reset, responds to a control signal on line 170 to accumulate the current digital value of $\bar{e}$.

Register 110 responds to a control signal on control line 111 by storing the value of $\hat{e}_1$ from memory location 100a, and a control signal on control line 121 causes register 120 to store $\hat{e}_1$ from register 110. Multiplier 130 is activated by a control signal on control line 131 to multiply $\hat{e}_1$ from register 110 by $\hat{e}_1$ from register 120 to produce $\hat{e}^2_1$. Multiplier 140 is then activated over control line 146 to cause multiplication of the value of $\hat{e}^2_1$ by K6 to produce K6 $\hat{e}^2_1$, which is made available to accumulator 176. A control signal on control line 172 causes accumulator 176 to add K6 $\hat{e}^2_1$ to the previously stored value of $\bar{e}$, thereby producing a partial sum represented by the expansion $$K1\hat{e}_1 + K2\hat{e}_2 + K3\hat{\lambda}^2_1 + K4\hat{\lambda}^2_2 + K5|\hat{e}_1 - \hat{e}_2| + K6\hat{e}^2_1$$

Register 110 is then activated by a control signal on line 113 for storing the $\hat{\lambda}^2_1$ signal from memory location 100c, and register 120 responds to a control signal on control line 121 for storing $\hat{\lambda}^2_1$. Multiplier 130 is enabled over control line 131 for causing multiplication of $\hat{\lambda}^2_1$ from register 110 by $\hat{\lambda}^2_1$ in register 120 to produce $\hat{\lambda}^4_1$, following which multiplier 140 responds to control line 147 for multiplying $\hat{\lambda}^4_1$ by a predetermined constant K7. Accumulator 176 accumulates the value of K7$\hat{\lambda}^4_1$ with the already-summed value $\bar{e}$+K6$\hat{e}^2_1$ to produce $\bar{e}$+K6$\hat{e}^2_1$+K7$\hat{\lambda}^4_1$.

Register 110 is enabled by control line 112 for storing $\hat{e}_2$. The value of $\hat{e}_2$ is transferred to register 120 in a fashion generally as described above, and the square $\hat{e}^2_2$ is generated in multiplier 130. A product K7$\hat{e}^2_2$ is generated by multiplier 140, which product is accumulated to produce $$\bar{e} + K6\hat{e}^2_1 + K7\hat{\lambda}^4_1 + K8\hat{e}^2_2$$

During the next step, $\hat{\lambda}^2_2$ stored in memory location 100d is stored in register 110 and 120, multiplier 130 produces $\hat{\lambda}^4_2$, and multiplier 140 multiplies by a predetermined constant K9 to produce K9$\hat{\lambda}^4_2$, which accumulator 176 accumulates to produce $$\bar{e} + K6\hat{e}^2_1 + K7\hat{\lambda}^4_1 + K8\hat{e}^2_2 + K9\hat{\lambda}^4_2,$$

Register 110 is enabled over control line 111 to cause storage of $\hat{e}_1$ from memory location 10a, which is transferred to register 120. Instead of multiplying immediately, register 110 is enabled over control line 112 to cause $\hat{e}_2$ to be loaded from memory location 100b. Multiplication then occurs in multiplier 130 to produce the product $\hat{e}_1\hat{e}_2$. Multiplier 140 multiplies product $\hat{e}_1\hat{e}_2$ by a predetermined constant K10, to produce K10$\hat{e}_1\hat{e}_2$. Accumulator 176 then accumulates to produce $$\bar{e} + K6\hat{e}_1 + K7\hat{\lambda}^4_1 + K8\hat{e}^2_2 + K9\hat{\lambda}^4_2 + K10\hat{e}_1\hat{e}_2$$

In generally similar manner, any other cross products among $\hat{e}_1$, $\hat{e}_2$, $\hat{\lambda}^2_1$ and $\hat{\lambda}^2_2$ may be produced, multiplied by constants, and accumulated. The final corrected altitude estimate is $$\overline{e}_1 = \overline{e} + K6\hat{e}^2_1 + K7\hat{\lambda}^4_1 + K8\hat{e}^2_2 + K9\hat{\lambda}^4_2 + K10\hat{e}_1\hat{e}_2 + K11\hat{e}_1\hat{\lambda}^2_1 + K12\hat{e}_1\hat{\lambda}^2_2 + K13\hat{\lambda}^2_1\hat{\lambda}^2_2 + K14\hat{e}_2\hat{\lambda}^2_2 + K15\hat{e}_2\hat{\lambda}^2_1$$

The following set of constants

Figure 2:
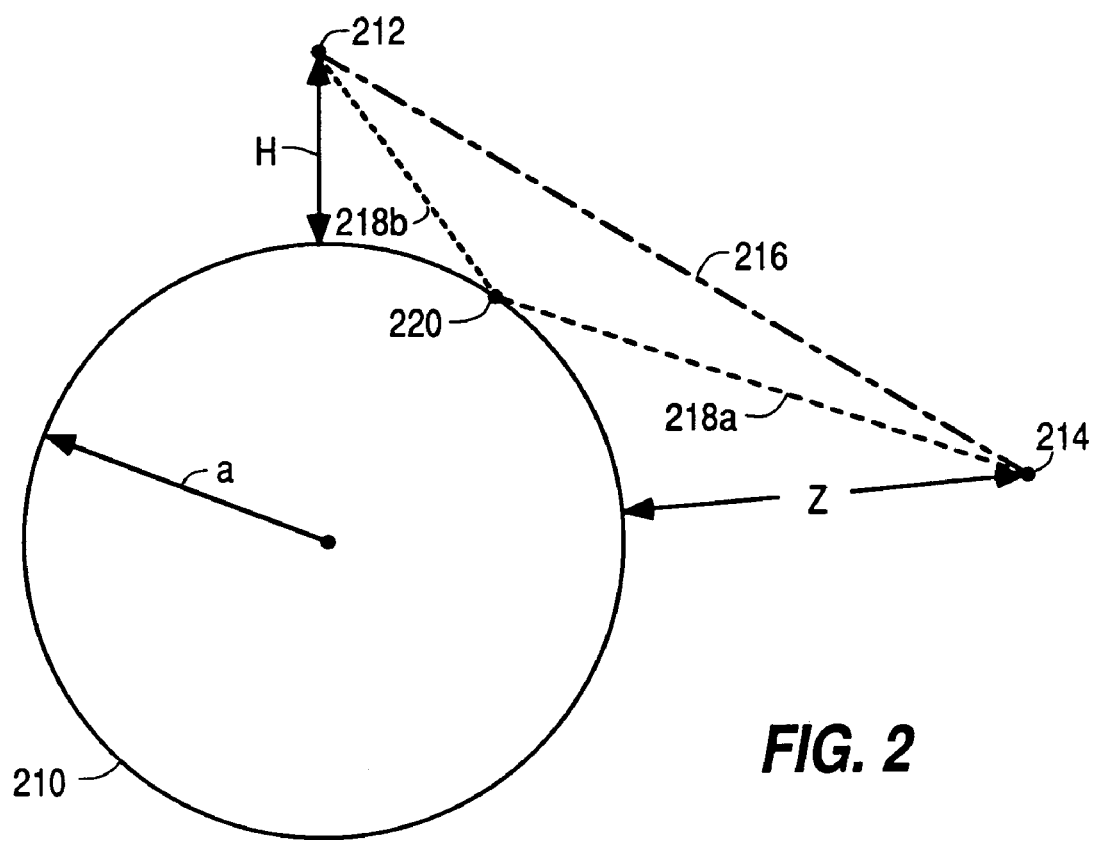
FIG. 2 is a diagram illustrating geometrical considerations relating to the generation of specular reflections from a target.
Figure 3:
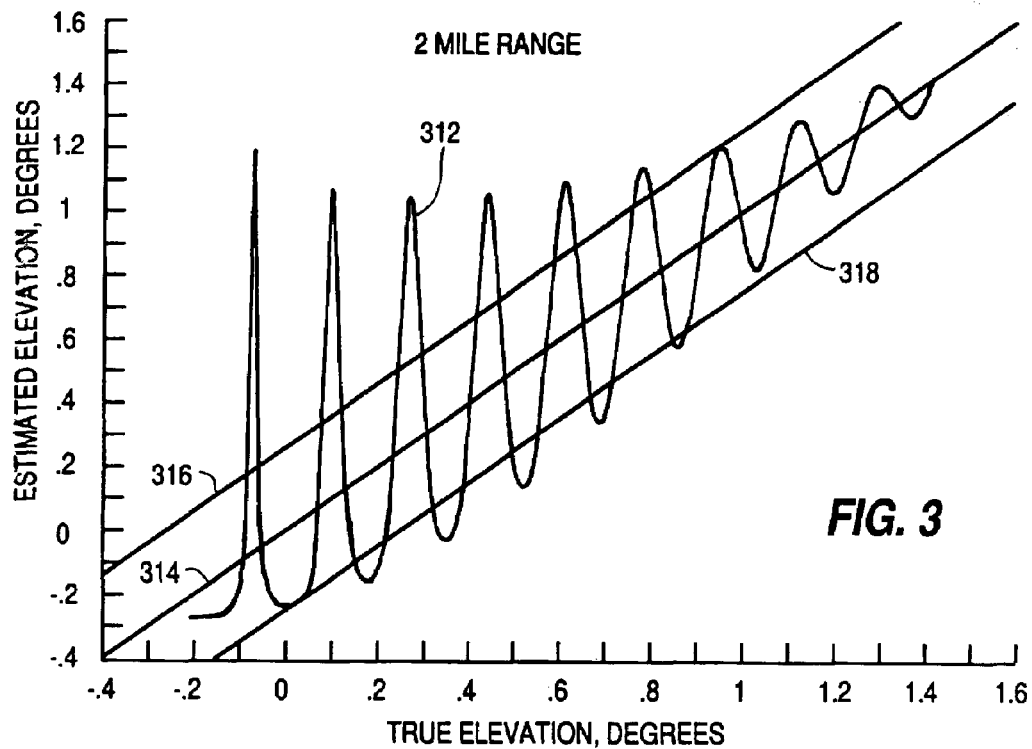
FIGS. 3 and 4 are computer-generated plots of estimated elevation angle in degrees versus true elevation angle in degrees, where the estimated angle is produced by the conventional monopulse radar system of FIG. 1 with 3 dB beamwidth of 2°, directed at an elevation angle of +0.9° for targets at 2 and 30-mile ranges, respectively, assuming a flat, perfectly reflective specular reflection point.
Figure 4:
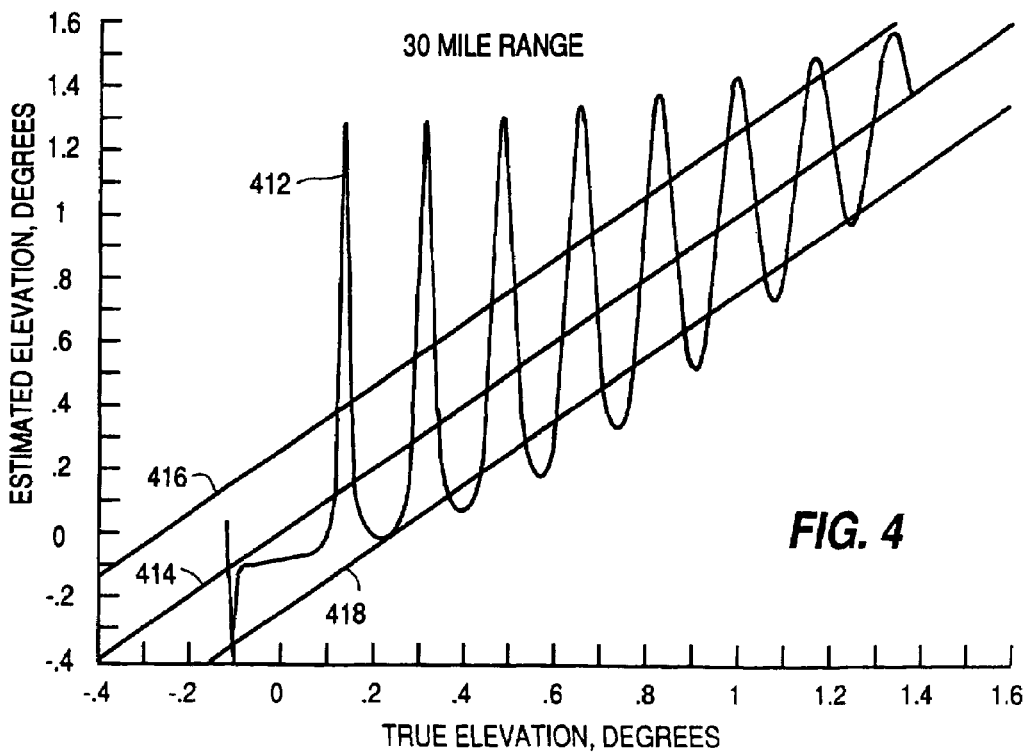

| | | |
|---|---|---|
| K1 = +1.3713 | K2 = −0.3713 | K3 = +0.1204 |
| K4 = −0.7371 | K5 = +1.3418 | K6 = −6.0468 |
| K7 = −2.1348 | K8 = −6.0468 | K9 = −0.0190 |
| K10 = +12.0936 | K11 = +5.3358 | K12 = +0.4529 |
| K13 = 0 | K14 = −0.4529 | K15 = −5.3358 | provides the results illustrated in FIG. 2 for a range of 30 miles and a wave height of zero.

Altitude estimate $\overline{e}_1$, is applied to display 46 instead of estimate $\overline{e}$.

Other embodiments of the invention will be apparent to those skilled in the art. For example, while the embodiments of FIGS. 1 and 8 use the same antenna 10 for both transmission and reception, the invention is not so dependent, and the transmission may be made by a different antenna in a different location than antenna 10, which in that case is used solely for reception.

What is claimed is:

1. A method for determining the elevation of a target, comprising the steps of:
    transmitting electromagnetic energy toward the target;
    directing first and second antenna beams toward said target for reception of reflections of said electromagnetic energy, said first and second beams being angularly spaced in the vertical plane to produce a lower beam and an upper beam, said angular spacing in the vertical plane being about one-third of a 3 dB beamwidth of one of said upper and lower beams;
    forming an upper monopulse estimate of the elevation angle of said target from said upper beam;
    forming a lower monopulse estimate of the elevation angle of said target from said lower beam;
    multiplying said upper monopulse estimate by a first predetermined constant to form a first corrected estimate of the elevation of said target;
    multiplying said lower monopulse estimate by a second predetermined constant to form a second corrected estimate of the elevation of said target; and
    adding together said first and second corrected estimates to form a further estimate of the elevation of said target.

2. A method according to claim 1 wherein said step of directing said first and second antenna beams are performed concurrently, and said steps of forming upper and lower monopulse estimates are performed concurrently.

3. A method according to claim 1 wherein said steps of directing said first antenna beams and forming one of said upper and lower monopulse estimates are performed before said steps of forming said second antenna beam and the other of said upper and lower monopulse estimates.

4. A method according to claim 1 wherein said upper monopulse estimate includes real and imaginary portions, and said first predetermined constant is bipartite to include first and second portions, and said real portion of said upper monopulse estimate is multiplied by said first portion of said first predetermined constant to form a corrected real portion of said upper monopulse estimate, and said imaginary portion of said upper monopulse estimate is multiplied by itself to form an upper imaginary square, and said upper imaginary square is multiplied by said second portion of said first predetermined constant and added to said corrected real portion of said upper monopulse estimate to form said first corrected estimate of the elevation of said target.

5. A method according to claim 4 wherein said lower monopulse estimate includes real and imaginary portions, and said second predetermined constant is bipartite to include first and second portions, and said real portion of said lower monopulse estimate is multiplied by said first portion of said second predetermined constant to form a corrected real portion of said lower monopulse estimate, and said imaginary portion of said lower monopulse estimate is multiplied by itself to form a lower imaginary square, and said lower imaginary square is multiplied by said second portion of said second predetermined constant and added to said corrected real portion of said lower monopulse estimate to form said second corrected estimate of the elevation of said target.

6. A method according to claim 5 further comprising the steps of:
    forming the absolute value of the difference between said real portion of said upper monopulse estimate and said real portion of the said lower monopulse estimate to form an absolute first difference;
    multiplying the said absolute first difference by a predetermined constant to form a corrected absolute first difference; and
    adding said corrected first difference to said second corrected estimate of the elevation of said target.

7. A method according to claim 6 further comprising the steps of:
    forming the product of said real portion of said upper monopulse estimate with itself to form an upper first square;
    forming the product of said upper imaginary square with itself to form an upper second square;
    multiplying said upper first and second squares by predetermined first and second further constants, respectively, to form corrected upper first and second squares; and
    adding said corrected upper first and second squares to said second corrected estimate of the elevation of said target.

8. A method according to claim 7 further comprising the steps of:
    forming the product of said real portion of said lower monopulse estimate with itself to form a lower first square;
    forming the product of said lower imaginary square with itself to form a lower second square;
    multiplying said lower first and lower second squares by predetermined first and second further constants, respectively, to form corrected lower first and lower second squares; and
    adding said corrected lower first and lower second squares to said second corrected estimate of the elevation of said target.

9. A method according to claim 8 further comprising the steps of:
    multiplying said upper monopulse estimate by said lower imaginary square to form a first cross product;
    multiplying said real portion of said lower monopulse estimate by said upper imaginary square to form a second cross product;
    multiplying said real portion of said upper monopulse estimate by said real portion of said lower monopulse estimate to from a third cross product;

multiplying said upper imaginary square by said lower imaginary square to form a fourth cross product' multiplying said upper first square by said upper imaginary square to from a fifth cross product;

multiplying said lower first square by said lower imaginary square to form a sixth cross product;

adding said first, second, third, fourth, fifth and sixth cross products at least to each other to form a further correction; and adding said further correction to said second corrected estimate of the elevation of said target.

* * * * *